(12) United States Patent
Islam et al.

(10) Patent No.: US 11,196,520 B2
(45) Date of Patent: Dec. 7, 2021

(54) JOINT ENCODING WAVEFORM AND SLOT INFORMATION

(71) Applicant: QUALCOMM Incorporated, San Diego, CA (US)

(72) Inventors: Muhammad Nazmul Islam, Edison, NJ (US); Tao Luo, San Diego, CA (US); Sony Akkarakaran, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 6 days.

(21) Appl. No.: 15/951,974

(22) Filed: Apr. 12, 2018

(65) Prior Publication Data

US 2018/0331801 A1 Nov. 15, 2018

Related U.S. Application Data

(60) Provisional application No. 62/505,958, filed on May 14, 2017.

(51) Int. Cl.
*H04L 5/00* (2006.01)
*H04W 72/04* (2009.01)
*H04W 74/08* (2009.01)

(52) U.S. Cl.
CPC .......... *H04L 5/0048* (2013.01); *H04L 5/0053* (2013.01); *H04L 5/0094* (2013.01);
(Continued)

(58) Field of Classification Search
None
See application file for complete search history.

(56) References Cited

U.S. PATENT DOCUMENTS 9,807,656 B2  10/2017  Fan et al.
2015/0131579 A1* 5/2015 Li .................. H04L 1/0072
370/329

(Continued)

FOREIGN PATENT DOCUMENTS

WO  WO2015051486 A1  4/2015
WO  WO-2018081385 A1  5/2018
(Continued)

OTHER PUBLICATIONS

AT&T: "PRACH Design for NR", 3GPP Draft; R1-1707756 PRACH Design for NR, 3rd Generation Partnership Project (3GPP), Mobile Competence Centre, 650, Route Des Lucioles, F-06921, Sophia-Antipolis Cedex, France, vol. RAN WG1, No. Hangzhou, China, May 15, 2017-May 19, 2017 May 7, 2017 (May 7, 2017), XP051263107, Retrieved from the Internet:URL:http://www.3gpp.org/ftp/tsg_ran/WG1_RL1/TSGR1 89/Docs/[retrieved on May 7, 2017]sections 1-3.

(Continued)

*Primary Examiner* — Ajit Patel
*Assistant Examiner* — Liem H. Nguyen
(74) *Attorney, Agent, or Firm* — Holland & Hart LLP

(57) ABSTRACT

Methods, systems, and devices for wireless communication are described. A base station may select a waveform configuration and a resource for a user equipment (UE) to use to transmit a random access channel (RACH) message 3 (msg3). The base station may transmit a value indicative of the waveform configuration to the UE, wherein the waveform configuration is further indicative of the selected resource. The UE may receive the value indication and identify the waveform configuration. Based on the waveform configuration, the UE may identify the resource to use to transmit the RACH msg3. The UE may transmit the (Continued)

RACH msg3 using the resource and according to the waveform configuration.

16 Claims, 22 Drawing Sheets

(52) U.S. Cl.
CPC ..... *H04W 72/042* (2013.01); *H04W 72/0446* (2013.01); *H04W 72/0453* (2013.01); *H04W 74/0833* (2013.01); *H04L 5/0007* (2013.01); *H04L 5/0051* (2013.01)

(56) References Cited

U.S. PATENT DOCUMENTS

| | | | |
|---|---|---|---|
| 2015/0181440 A1* | 6/2015 | Chen | H04L 5/02 370/329 |
| 2016/0192376 A1* | 6/2016 | Lee | H04W 48/20 370/252 |
| 2017/0339712 A1 | 11/2017 | Rico Alvarino et al. | |
| 2017/0367058 A1 | 12/2017 | Pelletier et al. | |
| 2018/0006791 A1* | 1/2018 | Marinier | H04L 1/0026 |
| 2018/0007709 A1 | 1/2018 | Seo et al. | |
| 2018/0254860 A1* | 9/2018 | Wong | H04L 1/1664 |
| 2018/0279361 A1* | 9/2018 | Yoo | H04W 74/0833 |
| 2018/0324715 A1* | 11/2018 | Ryoo | H04W 52/365 |
| 2018/0324850 A1* | 11/2018 | Amuru | H04L 5/0053 |
| 2019/0260498 A1* | 8/2019 | Moroga | H04L 1/0003 |
| 2019/0373644 A1* | 12/2019 | Wang | H04L 5/0007 |
| 2020/0068539 A1* | 2/2020 | Liu | H04L 5/0007 |

FOREIGN PATENT DOCUMENTS

| | | |
|---|---|---|
| WO | WO-2018082600 A1 | 5/2018 |
| WO | WO-2018085701 A1 | 5/2018 |
| WO | WO-2018094094 A2 | 5/2018 |

OTHER PUBLICATIONS

CATT: "Discussion on NR4-Step RA Procedure", 3GPP Draft; R1-1700185, 3rd Generation Partnership Project (3GPP), Mobile Competence Centre, 650, Route Des Lucioles, F-06921, Sophia-Antipolis Cedex, France, vol. RAN WG1, No. Spokane, USA, Jan. 16, 2017-Jan. 20, 2017 Jan. 16, 2017 (Jan. 16, 2017), XP051207725, Retrieved from the Internet: URL:http://www.3gpp.org/ftp/Meetings_3GPP SYNC/RAN1/Docs/ [retrieved on Jan. 16, 2017], 4 pages.
International Search Report and Written Opinion—PCT/US2018/027615—ISA/EPO—dated Jul. 19, 2018 (174368WO).
Qualcomm Incorporated: "4-Step RACH Procedure Consideration", 3GPP Draft, R1-1708575, 4 Step Rach Procedure Consideration, 3rd Generation Partnership Project (3GPP), Mobile Competence Centre, 650, Route Des Lucioles, F-06921, Sophia-Antipolis Cedex, France, vol. RAN WG1, No. Hangzhou, China, May 15, 2017-May 19, 2017 May 7, 2017 (May 7, 2017), XP051263217, Retrieved from the Internet: URL:http://www.3gpp.org/ftp/tsg_ran/WG1_RL1/TSGR1_89/Docs/ [retrieved on May 7, 2017], 16 pages.

* cited by examiner

JOINT ENCODING WAVEFORM AND SLOT INFORMATION

CROSS REFERENCES

The present Application for Patent claims priority to U.S. Provisional Patent Application No. 62/505,958 by ISLAM, et al., entitled "Joint Encoding Waveform and Slot Information," filed May 14, 2017, assigned to the assignee hereof.

INTRODUCTION

The following relates generally to wireless communication, and more specifically to joint encoding waveform and slot information.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communication system may include a number of base stations or access network nodes, each simultaneously supporting communication for multiple communication devices, which may be otherwise known as user equipment (UE).

Wireless communication systems may be configured to convey various information in a predetermined manner. For example, wireless communication systems may use a random access channel (RACH) procedure for the UE to attach to the base station. The RACH procedure may include the UE and base station exchanging various messages according to certain configurations, e.g., frequency/slot information, transmission parameters, and the like. Such configuration information is typically signaled according to the configuration of the wireless communication system. These signaling techniques, however, may include signaling each piece of the configuration information in a dedicated location and manner, which may consume excessive over-the-air resources of the wireless communication system. Aspects of the present disclosure provide for joint encoding of waveform and slot information in a manner that conserves resources and, in some aspects, supports signaling additional information using the same amount of resources.

SUMMARY

A method of wireless communication is described. The method may include selecting a waveform configuration and a resource for a UE to use to transmit a RACH message 3 (msg3) and transmitting a value indicative of the waveform configuration to the UE, wherein the waveform configuration is further indicative of the selected resource.

An apparatus for wireless communication is described. The apparatus may include means for selecting a waveform configuration and a resource for a UE to use to transmit a RACH msg3 and means for transmitting a value indicative of the waveform configuration to the UE, wherein the waveform configuration is further indicative of the selected resource.

Another apparatus for wireless communication is described. The apparatus may include a processor, memory in electronic communication with the processor, and instructions stored in the memory. The instructions may be operable to cause the processor to select a waveform configuration and a resource for a UE to use to transmit a RACH msg3 and transmit a value indicative of the waveform configuration to the UE, wherein the waveform configuration is further indicative of the selected resource.

A non-transitory computer readable medium for wireless communication is described. The non-transitory computer-readable medium may include instructions operable to cause a processor to select a waveform configuration and a resource for a UE to use to transmit a RACH msg3 and transmit a value indicative of the waveform configuration to the UE, wherein the waveform configuration is further indicative of the selected resource.

Some examples of the method, apparatus, and non-transitory computer-readable medium described above may further include processes, features, means, or instructions for determining that the selected waveform configuration indicates a portion of the indication of the resource. Some examples of the method, apparatus, and non-transitory computer-readable medium described above may further include processes, features, means, or instructions for configuring at least a portion of a RACH message 2 (msg2) to convey a remaining portion of the indication of the resource.

Some examples of the method, apparatus, and non-transitory computer-readable medium described above may further include processes, features, means, or instructions for determining, based at least in part on the resource, a number of demodulation reference signals (DMRS) to be transmitted in the RACH msg3 transmission, wherein the selected waveform configuration further indicates the number of DMRS.

Some examples of the method, apparatus, and non-transitory computer-readable medium described above may further include processes, features, means, or instructions for determining, based at least in part on the waveform configuration comprising a discrete fourier transform spread orthogonal frequency division multiplexing (DFT-S-OFDM) waveform configuration, that the resource comprises a number of time-frequency resources exceeding a threshold level.

Some examples of the method, apparatus, and non-transitory computer-readable medium described above may further include processes, features, means, or instructions for determining, based at least in part on the waveform configuration comprising cyclic prefix orthogonal frequency division multiplexing (CP-OFDM) waveform configuration, that the resource comprises a number of time-frequency resources below a threshold level.

In some examples of the method, apparatus, and non-transitory computer-readable medium described above, the resource comprises at least one of a time resource, a frequency resource, or a time-frequency resource.

In some examples of the method, apparatus, and non-transitory computer-readable medium described above, the time resource comprises a number of symbols associated with the RACH msg3 transmission.

In some examples of the method, apparatus, and non-transitory computer-readable medium described above, the value indication may be transmitted in at least one of a master information block (MIB), a system information block (SIB), a minimum system information block (MSIB), or an other system information block (OSIB).

In some examples of the method, apparatus, and non-transitory computer-readable medium described above, the waveform configuration may be selected based at least in part on the selected resource.

In some examples of the method, apparatus, and non-transitory computer-readable medium described above, the resource may be selected based at least in part on the selected waveform configuration.

A method of wireless communication is described. The method may include receiving a value indicative of a waveform configuration to use for uplink transmission of a RACH msg3, identifying, based at least in part on the waveform configuration, a resource to use to transmit the RACH msg3, and transmitting the RACH msg3 using the identified resource and according to the waveform configuration.

An apparatus for wireless communication is described. The apparatus may include means for receiving a value indicative of a waveform configuration to use for uplink transmission of a RACH msg3, means for identifying, based at least in part on the waveform configuration, a resource to use to transmit the RACH msg3, and means for transmitting the RACH msg3 using the identified resource and according to the waveform configuration.

Another apparatus for wireless communication is described. The apparatus may include a processor, memory in electronic communication with the processor, and instructions stored in the memory. The instructions may be operable to cause the processor to receive a value indicative of a waveform configuration to use for uplink transmission of a RACH msg3, identify, based at least in part on the waveform configuration, a resource to use to transmit the RACH msg3, and transmit the RACH msg3 using the identified resource and according to the waveform configuration.

A non-transitory computer readable medium for wireless communication is described. The non-transitory computer-readable medium may include instructions operable to cause a processor to receive a value indicative of a waveform configuration to use for uplink transmission of a RACH msg3, identify, based at least in part on the waveform configuration, a resource to use to transmit the RACH msg3, and transmit the RACH msg3 using the identified resource and according to the waveform configuration.

Some examples of the method, apparatus, and non-transitory computer-readable medium described above may further include processes, features, means, or instructions for determining that the selected waveform configuration indicates a portion of the indication of the resource. Some examples of the method, apparatus, and non-transitory computer-readable medium described above may further include processes, features, means, or instructions for decoding at least a portion of an information block message or a RACH message 2 (msg2) that conveys a remaining portion of the indication of the resource.

Some examples of the method, apparatus, and non-transitory computer-readable medium described above may further include processes, features, means, or instructions for determining, based at least in part on the resource, a number of DMRS to transmit in the RACH msg3 transmission. Some examples of the method, apparatus, and non-transitory computer-readable medium described above may further include processes, features, means, or instructions for transmitting the determined number of DMRS.

In some examples of the method, apparatus, and non-transitory computer-readable medium described above, the waveform configuration comprises at least one of a CP-OFDM waveform configuration or a DFT-S-OFDM waveform configuration.

A method of wireless communication is described. The method may include transmitting, to a UE, an information block message indicating that a first communication configuration is to be used for a RACH message transmission, transmitting, during a RACH procedure, an initial RACH message indicating that a second communication configuration is to be used for the RACH message transmission, and receiving the RACH message transmitted according to the second communication configuration.

An apparatus for wireless communication is described. The apparatus may include means for transmitting, to a UE, an information block message indicating that a first communication configuration is to be used for a RACH message transmission, means for transmitting, during a RACH procedure, an initial RACH message indicating that a second communication configuration is to be used for the RACH message transmission, and means for receiving the RACH message transmitted according to the second communication configuration.

Another apparatus for wireless communication is described. The apparatus may include a processor, memory in electronic communication with the processor, and instructions stored in the memory. The instructions may be operable to cause the processor to transmit, to a UE, an information block message indicating that a first communication configuration is to be used for a RACH message transmission, transmit, during a RACH procedure, an initial RACH message indicating that a second communication configuration is to be used for the RACH message transmission, and receive the RACH message transmitted according to the second communication configuration.

A non-transitory computer readable medium for wireless communication is described. The non-transitory computer-readable medium may include instructions operable to cause a processor to transmit, to a UE, an information block message indicating that a first communication configuration is to be used for a RACH message transmission, transmit, during a RACH procedure, an initial RACH message indicating that a second communication configuration is to be used for the RACH message transmission, and receive the RACH message transmitted according to the second communication configuration.

In some examples of the method, apparatus, and non-transitory computer-readable medium described above, the first communication configuration comprises a CP-OFDM waveform configuration, and the second communication configuration comprises a DFT-S-OFDM waveform configuration.

In some examples of the method, apparatus, and non-transitory computer-readable medium described above, the first communication configuration comprises a DFT-S-OFDM waveform configuration, and the second communication configuration comprises a CP-OFDM waveform configuration.

In some examples of the method, apparatus, and non-transitory computer-readable medium described above, the first communication configuration comprises a first retransmission parameter associated with a RACH msg3 transmission, and the second communication configuration comprises a second retransmission parameter associated with the RACH msg3 transmission.

In some examples of the method, apparatus, and non-transitory computer-readable medium described above, the information block message comprises at least one of a MIB, a SIB, or a MSIB, an OSIB, or a remaining portion of a MSIB.

In some examples of the method, apparatus, and non-transitory computer-readable medium described above, the RACH message comprises a RACH msg3 and the initial RACH message comprises a RACH msg2.

Some examples of the method, apparatus, and non-transitory computer-readable medium described above may further include processes, features, means, or instructions for determining that a communication link with the UE may have degraded and may be unable to support the first communication configuration, wherein the initial RACH message indicating the second communication configuration may be transmitted based at least in part on the degraded communication link.

A method of wireless communication is described. The method may include receiving an information block message indicating that a first communication configuration is to be used for a RACH message transmission, receiving, during a RACH procedure, an initial RACH message indicating that a second communication configuration is to be used for the RACH message, and transmitting the RACH message according to the second communication configuration.

An apparatus for wireless communication is described. The apparatus may include means for receiving an information block message indicating that a first communication configuration is to be used for a RACH message transmission, means for receiving, during a RACH procedure, an initial RACH message indicating that a second communication configuration is to be used for the RACH message, and means for transmitting the RACH message according to the second communication configuration.

Another apparatus for wireless communication is described. The apparatus may include a processor, memory in electronic communication with the processor, and instructions stored in the memory. The instructions may be operable to cause the processor to receive an information block message indicating that a first communication configuration is to be used for a RACH message transmission, receive, during a RACH procedure, an initial RACH message indicating that a second communication configuration is to be used for the RACH message, and transmit the RACH message according to the second communication configuration.

A non-transitory computer readable medium for wireless communication is described. The non-transitory computer-readable medium may include instructions operable to cause a processor to receive an information block message indicating that a first communication configuration is to be used for a RACH message transmission, receive, during a RACH procedure, an initial RACH message indicating that a second communication configuration is to be used for the RACH message, and transmit the RACH message according to the second communication configuration.

In some examples of the method, apparatus, and non-transitory computer-readable medium described above, the first communication configuration comprises a CP-OFDM waveform configuration, and the second communication configuration comprises a DFT-S-OFDM waveform configuration.

In some examples of the method, apparatus, and non-transitory computer-readable medium described above, the first communication configuration comprises a DFT-S-OFDM waveform configuration, and the second communication configuration comprises a CP-OFDM waveform configuration.

In some examples of the method, apparatus, and non-transitory computer-readable medium described above, the first communication configuration comprises a first retransmission parameter associated with a RACH msg3 transmission, and the second communication configuration comprises a second retransmission parameter associated with the RACH msg3 transmission.

A method of wireless communication is described. The method may include selecting a waveform configuration to transmit a RACH msg2 or a RACH message 4 (msg4) to a UE, configuring one or more bits of an information block message or the RACH msg2 to indicate the selected waveform configuration, and transmitting an information block message or the RACH msg2 to the UE that indicates the selected waveform configuration.

An apparatus for wireless communication is described. The apparatus may include means for selecting a waveform configuration to transmit a RACH msg2 or a RACH msg4 to a UE, means for configuring one or more bits of an information block message or the RACH msg2 to indicate the selected waveform configuration, and means for transmitting an information block message or the RACH msg2 to the UE that indicates the selected waveform configuration.

Another apparatus for wireless communication is described. The apparatus may include a processor, memory in electronic communication with the processor, and instructions stored in the memory. The instructions may be operable to cause the processor to select a waveform configuration to transmit a RACH msg2 or a RACH msg4 to a UE, configure one or more bits of an information block message or the RACH msg2 to indicate the selected waveform configuration, and transmit an information block message or the RACH msg2 to the UE that indicates the selected waveform configuration.

A non-transitory computer readable medium for wireless communication is described. The non-transitory computer-readable medium may include instructions operable to cause a processor to select a waveform configuration to transmit a RACH msg2 or a RACH msg4 to a UE, configure one or more bits of an information block message or the RACH msg2 to indicate the selected waveform configuration, and transmit an information block message or the RACH msg2 to the UE that indicates the selected waveform configuration.

Some examples of the method, apparatus, and non-transitory computer-readable medium described above may further include processes, features, means, or instructions for configuring one or more bits of a physical downlink control channel (PDCCH) portion of the RACH msg2 to indicate the selected waveform configuration.

Some examples of the method, apparatus, and non-transitory computer-readable medium described above may further include processes, features, means, or instructions for configuring one or more bits of a MSIB message to indicate the selected waveform configuration.

Some examples of the method, apparatus, and non-transitory computer-readable medium described above may further include processes, features, means, or instructions for configuring one or more bits of a MSIB message and one or more bits of a PDCCH portion of the RACH msg2 to indicate the selected waveform configuration.

Some examples of the method, apparatus, and non-transitory computer-readable medium described above may further include processes, features, means, or instructions for configuring one or more bits of the information block message or the RACH msg2 to indicate the selected waveform configuration for both the RACH msg2 and the RACH msg4.

In some examples of the method, apparatus, and non-transitory computer-readable medium described above, the waveform configuration for the RACH msg2 or the RACH msg3 comprises at least one of a CP-OFDM waveform configuration or a DFT-S-OFDM waveform configuration.

A method of wireless communication is described. The method may include receiving at least one of an information block message or a RACH msg2 from a base station, the information block message or the RACH msg2 comprising an indication of a selected waveform configuration to be used to transmit the RACH msg2 or a RACH msg4, determining the selected waveform configuration based on the indication in the information block message or the RACH msg2, and receiving at least one of the RACH msg2 or the RACH msg4 according to the waveform configuration.

An apparatus for wireless communication is described. The apparatus may include means for receiving at least one of an information block message or a RACH msg2 from a base station, the information block message or the RACH msg2 comprising an indication of a selected waveform configuration to be used to transmit the RACH msg2 or a RACH msg4, means for determining the selected waveform configuration based on the indication in the information block message or the RACH msg2, and means for receiving at least one of the RACH msg2 or the RACH msg4 according to the waveform configuration.

Another apparatus for wireless communication is described. The apparatus may include a processor, memory in electronic communication with the processor, and instructions stored in the memory. The instructions may be operable to cause the processor to receive at least one of an information block message or a RACH msg2 from a base station, the information block message or the RACH msg2 comprising an indication of a selected waveform configuration to be used to transmit the RACH msg2 or a RACH message 4 (msg4), determine the selected waveform configuration based on the indication in the information block message or the RACH msg2, and receive at least one of the RACH msg2 or the RACH msg4 according to the waveform configuration.

A non-transitory computer readable medium for wireless communication is described. The non-transitory computer-readable medium may include instructions operable to cause a processor to receive at least one of an information block message or a RACH msg2 from a base station, the information block message or the RACH msg2 comprising an indication of a selected waveform configuration to be used to transmit the RACH msg2 or a RACH msg4, determine the selected waveform configuration based on the indication in the information block message or the RACH msg2, and receive at least one of the RACH msg2 or the RACH msg4 according to the waveform configuration.

Some examples of the method, apparatus, and non-transitory computer-readable medium described above may further include processes, features, means, or instructions for decoding one or more bits of a PDCCH portion of the RACH msg2 to determine the indication the selected waveform configuration.

Some examples of the method, apparatus, and non-transitory computer-readable medium described above may further include processes, features, means, or instructions for decoding one or more bits of a MSIB message to determine the indication of the selected waveform configuration.

Some examples of the method, apparatus, and non-transitory computer-readable medium described above may further include processes, features, means, or instructions for decoding one or more bits of a MSIB message and one or more bits of a PDCCH portion of the RACH msg2 to determine the indication the selected waveform configuration.

Some examples of the method, apparatus, and non-transitory computer-readable medium described above may further include processes, features, means, or instructions for decoding one or more bits of the information block message or the RACH msg2 to determine the indication the selected waveform configuration for both the RACH msg2 and the RACH msg4.

A method of wireless communication is described. The method may include selecting a resource configuration for one or more of a RACH msg2 transmission and a RACH msg3 transmission, configuring one or more bits of a PDCCH portion of the RACH msg2 to indicate the resource configuration, and transmitting the RACH msg2 comprising the configured PDCCH portion to provide the indication of the resource configuration.

An apparatus for wireless communication is described. The apparatus may include means for selecting a resource configuration for one or more of a RACH msg2 transmission and a RACH msg3 transmission, means for configuring one or more bits of a PDCCH portion of the RACH msg2 to indicate the resource configuration, and means for transmitting the RACH msg2 comprising the configured PDCCH portion to provide the indication of the resource configuration.

Another apparatus for wireless communication is described. The apparatus may include a processor, memory in electronic communication with the processor, and instructions stored in the memory. The instructions may be operable to cause the processor to select a resource configuration for one or more of a RACH msg2 transmission and a RACH msg3 transmission, configure one or more bits of a PDCCH portion of the RACH msg2 to indicate the resource configuration, and transmit the RACH msg2 comprising the configured PDCCH portion to provide the indication of the resource configuration.

A non-transitory computer readable medium for wireless communication is described. The non-transitory computer-readable medium may include instructions operable to cause a processor to select a resource configuration for one or more of a RACH msg2 transmission and a RACH msg3 transmission, configure one or more bits of a PDCCH portion of the RACH msg2 to indicate the resource configuration, and transmit the RACH msg2 comprising the configured PDCCH portion to provide the indication of the resource configuration.

In some examples of the method, apparatus, and non-transitory computer-readable medium described above, the resource configuration comprises at least one of a time resource, a frequency resource, or a time-frequency resource.

In some examples of the method, apparatus, and non-transitory computer-readable medium described above, the time resource comprises at least one of a slot configuration or a mini-slot configuration.

Some examples of the method, apparatus, and non-transitory computer-readable medium described above may further include processes, features, means, or instructions for receiving a RACH msg3 transmission from a UE, the RACH msg3 transmitted according to the resource configuration.

Some examples of the method, apparatus, and non-transitory computer-readable medium described above may further include processes, features, means, or instructions for configuring one or more bits of a payload portion of the RACH msg2 to provide the indication of the resource configuration of the RACH msg3.

In some examples of the method, apparatus, and non-transitory computer-readable medium described above, the configured one or more bits provide an implicit indication of one or more of a beamforming pattern used for transmission of the RACH msg2 and a number of user equipment multiplexed on the RACH msg2.

Some examples of the method, apparatus, and non-transitory computer-readable medium described above may further include processes, features, means, or instructions for determining whether at least one of a reliability metric or a priority level associated with the RACH msg2 and the RACH msg3 may have exceeded a threshold level. Some examples of the method, apparatus, and non-transitory computer-readable medium described above may further include processes, features, means, or instructions for configuring, based at least in part on the determining, one or more bits of a payload portion of the RACH msg2 to provide the indication of the resource configuration.

In some examples of the method, apparatus, and non-transitory computer-readable medium described above, the resource configuration comprises a downlink slot format for the RACH msg2.

In some examples of the method, apparatus, and non-transitory computer-readable medium described above, the resource configuration of the RACH msg3 comprises a waveform configuration for the RACH msg3, an uplink slot format for the RACH msg3, or combinations thereof.

A method of wireless communication is described. The method may include receiving a RACH msg3 grant from a base station, decoding one or more bits of a PDCCH portion of the RACH msg3 grant to identify a resource configuration for retransmission of a RACH msg3, and retransmitting the RACH msg3 according to the resource configuration.

An apparatus for wireless communication is described. The apparatus may include means for receiving a RACH msg3 grant from a base station, means for decoding one or more bits of a PDCCH portion of the RACH msg3 grant to identify a resource configuration for retransmission of a RACH msg3, and means for retransmitting the RACH msg3 according to the resource configuration.

Another apparatus for wireless communication is described. The apparatus may include a processor, memory in electronic communication with the processor, and instructions stored in the memory. The instructions may be operable to cause the processor to receive a RACH msg3 grant from a base station, decode one or more bits of a PDCCH portion of the RACH msg3 grant to identify a resource configuration for retransmission of a RACH msg3, and retransmit the RACH msg3 according to the resource configuration.

A non-transitory computer readable medium for wireless communication is described. The non-transitory computer-readable medium may include instructions operable to cause a processor to receive a RACH msg3 grant from a base station, decode one or more bits of a PDCCH portion of the RACH msg3 grant to identify a resource configuration for retransmission of a RACH msg3, and retransmit the RACH msg3 according to the resource configuration.

Some examples of the method, apparatus, and non-transitory computer-readable medium described above may further include processes, features, means, or instructions for decoding one or more bits of a payload portion of the RACH msg2 to identify the indication of the resource configuration of the RACH msg3.

In some examples of the method, apparatus, and non-transitory computer-readable medium described above, the one or more bits provide an implicit indication of one or more of a beamforming pattern used for transmission of the RACH msg2 and a number of user equipment multiplexed on the RACH msg2.

In some examples of the method, apparatus, and non-transitory computer-readable medium described above, the resource configuration comprises a downlink slot format for the RACH msg2.

In some examples of the method, apparatus, and non-transitory computer-readable medium described above, the resource configuration comprises a waveform configuration for the RACH msg3, an uplink slot format for the RACH msg3, or combinations thereof.

DETAILED DESCRIPTION

Aspects of the disclosure are initially described in the context of a wireless communication system. In some aspects, the present disclosure provides various techniques for joint encoding of resource, timing, waveform, and other parameters in a manner to conserves over-the-air and signaling resources and, in some examples, supports signaling additional information using the same (or less) resources. As one example associated with a RACH procedure, the described techniques support random access response (RAR) signaling of timing information (e.g., slot, mini-slot information) for a RACH msg3 as a function of the waveform selected for the RACH msg3. For example, the gNB may select a resource based on the desired waveform configuration and/or select a waveform configuration based on the desired resource. Accordingly, the waveform configuration signaled to the UE may also implicitly convey an indication of the resource that the UE is to use for RACH msg3 transmission.

As another example, the described techniques support signaling in the RACH msg2 regarding the RACH msg3 waveform overwriting the RACH msg3 waveform signaling originally conveyed in a MSIB message. For example, the gNB may determine that the channel quality has degraded between the gNB and the UE since the MSIB message was sent and therefore configure the RACH msg2 to convey updated waveform information. The UE receiving the updated waveform configuration in the RACH msg2 may discard or otherwise overwrite the waveform configuration carried in the MSIB.

As another example, the described techniques support the gNB signaling the waveform configuration for RACH msg2 using available bit(s) of the MSIB and/or using the PDCCH of the RACH msg2. For example, the gNB may be a mmW gNB and may select the waveform configuration for the RACH msg2. The gNB may configure the MSIB bit(s) and/or PDCCH of RACH msg2 to carry or otherwise indicate the RACH msg2 waveform information.

As another example, the described techniques support the gNB using the PDCCH of RACH msg2 to signal the downlink slot format of RACH msg2 and/or RACH msg3 information (e.g., RACH msg3 waveform, slot information, etc.). In some aspects, the resource configuration information may be repeated in the payload portion of the RACH msg2.

As another example, the described techniques support the gNB selecting a resource configuration for a RACH msg3 retransmission, configuring one or more bits of a PDCCH portion of a RACH msg3 grant to indicate the resource configuration, transmitting the RACH msg3 grant comprising the configured PDCCH portion to provide the indication of the resource configuration, and receiving a retransmission of the RACH msg3 according to the resource configuration.

Aspects of the disclosure are further illustrated by and described with reference to apparatus diagrams, system diagrams, and flowcharts that relate to joint encoding waveform and slot information.

Figure 1:
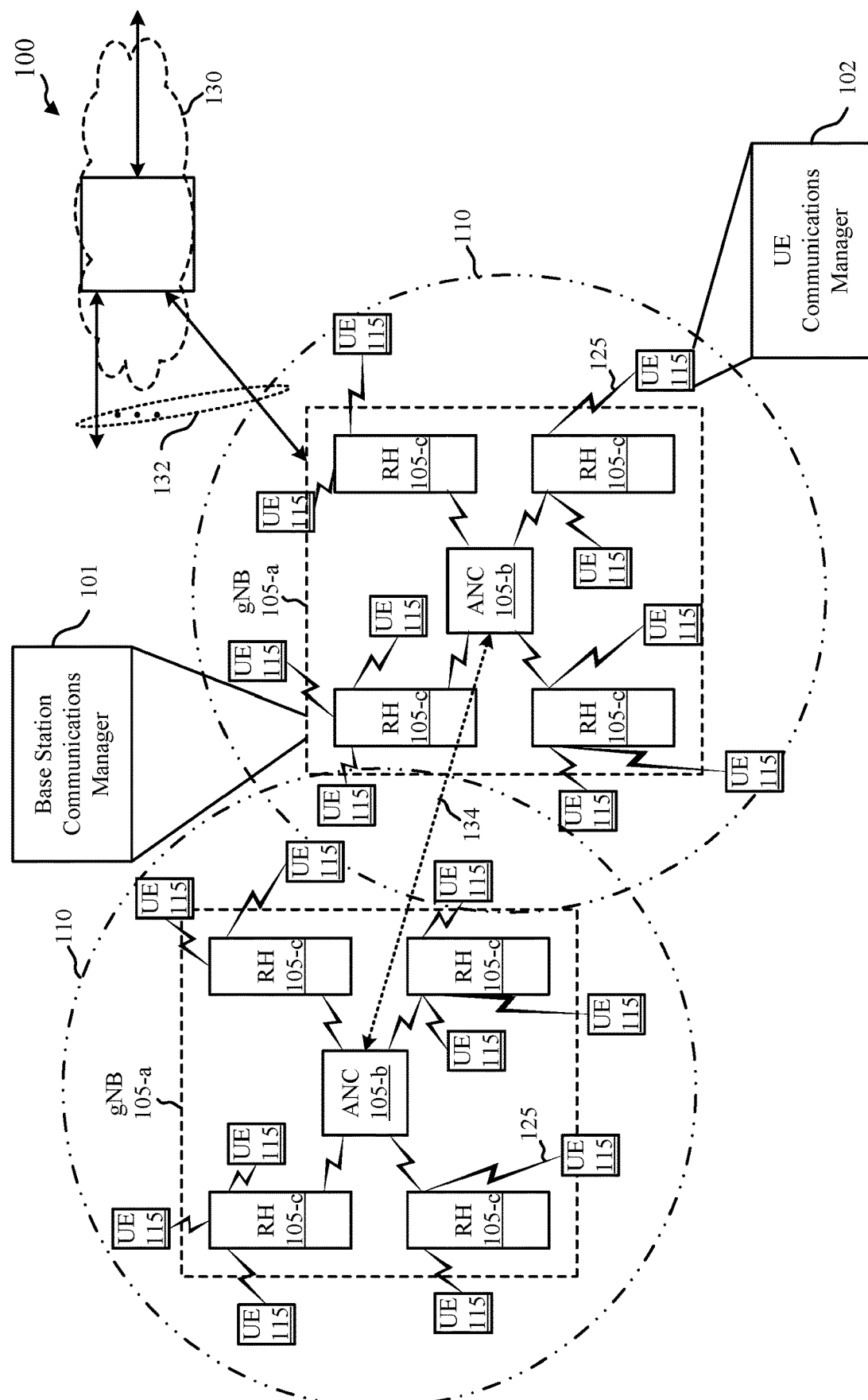
FIG. 1 illustrates an example of a system for wireless communication that supports joint encoding waveform and slot information, in accordance with one or more aspects of the present disclosure.

FIG. 1 illustrates an example of a wireless communication system 100, in accordance with one or more aspects of the present disclosure. The wireless communication system 100 includes base stations 105 (e.g., gNodeBs (gNBs), and/or radio heads (RHs) 105-c), UEs 115, and a core network 130. In some examples, the wireless communication system 100 may be a LTE, LTE-Advanced (LTE-A) network, or a New Radio (NR) network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system may be configured to provide ultra-reliable communications for these functions.

Base stations 105 may perform radio configuration and scheduling for communication with UEs 115, or may operate under the control of a base station controller (not shown). In some examples, base stations 105 may be macro cells, small cells, hot spots, or the like.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Wireless communication system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communication system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communication system 100 may be a packet-based network that operate according to a layered protocol stack. In the user plane, communications at the bearer or packet data convergence protocol (PDCP) layer may be IP-based. A RLC layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the radio resource control (RRC) protocol layer may provide establishment, configuration, and maintenance of an RRC connection between a UE 115 and a network device 105-c, network device 105-b, or core network 130 supporting radio bearers for user plane data. At the physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

A transport channel used for access to the network when the UE 115 does not have accurate uplink timing synchronization, or when the UE 115 does not have any allocated uplink transmission resource. The RACH is normally contention-based, which may result in collisions between UEs. After the UE 115 decodes an information block message, it may transmit a RACH preamble to a base station 105. This may be known as RACH msg1. For example, the RACH preamble may be randomly selected from a set of 64 predetermined sequences. This may enable the base station 105 to distinguish between multiple UEs 115 trying to access the system simultaneously. The base station 105 may respond with a RAR, or RACH msg2, that provides an uplink resource grant, a timing advance and a temporary cell radio network temporary identity (C-RNTI). The UE 115 may then transmit an RRC connection request, or RACH msg3, along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message, or RACH msg4, addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

In some aspect, a base station 105 may include a base station communications manager 101. The base station communications manager 101 may select a waveform configuration and a resource for a UE to use to transmit a RACH msg3. The base station communications manager 101 may transmit a value indicative of the waveform configuration to the UE 115, wherein the waveform configuration is further indicative of the selected resource.

In some aspects, the base station communications manager 101 may transmit, to a UE 115, an information block message indicating that a first communication configuration is to be used for a RACH message transmission. The base station communications manager 101 may transmit, during a RACH procedure, an initial RACH message indicating that a second communication configuration is to be used for the RACH message transmission. The base station communications manager 101 may receive the RACH message transmitted according to the second communication configuration.

In some aspects, the base station communications manager 101 may select a waveform configuration to transmit a RACH msg2 or a RACH msg4 to a UE 115. The base station communications manager 101 may configure one or more bits of an information block message or the RACH msg2 to indicate the selected waveform configuration. The base station communications manager 101 may transmit an information block message or the RACH msg2 to the UE 115 that indicates the selected waveform configuration.

In some aspects, the base station communications manager 101 may select a resource configuration for a RACH msg3 retransmission. The base station communications manager 101 may configure one or more bits of a PDCCH portion of a RACH msg3 grant to indicate the resource configuration. The base station communications manager 101 may transmit the RACH msg3 grant comprising the configured PDCCH portion to provide the indication of the resource configuration.

In some aspect, a UE 115 may include a UE communications manager 102. The UE communications manager 102 may receive a value indicative of a waveform configuration to use for uplink transmission of a RACH msg3. The UE communications manager 102 may identify, based at least in part on the waveform configuration, a resource to use to transmit the RACH msg3. The UE communications manager 102 may transmit the RACH msg3 using the identified resource and according to the waveform configuration.

In some aspects, the UE communications manager 102 may receive an information block message indicating that a first communication configuration is to be used for a RACH message transmission. The UE communications manager 102 may receive, during a RACH procedure, an initial RACH message indicating that a second communication configuration is to be used for the RACH message. The UE communications manager 102 may transmit the RACH message according to the second communication configuration.

In some aspects, the UE communications manager 102 may receive at least one of an information block message or a RACH msg2 from a base station, the information block message or the RACH msg2 comprising an indication of a selected waveform configuration to be used to transmit the RACH msg2 or a RACH msg4. The UE communications manager 102 may determine the selected waveform configuration based on the indication in the information block message or the RACH msg2. The UE communications manager 102 may receive at least one of the RACH msg2 or the RACH msg4 according to the waveform configuration.

In some aspects, the UE communications manager 102 may receiving a RACH msg3 grant from a base station 105. The UE communications manager 102 may decode one or more bits of a PDCCH portion of the RACH msg3 grant to identify a resource configuration for retransmission of a RACH msg3. The UE communications manager 102 may retransmit the RACH msg3 according to the resource configuration.

Figure 2:
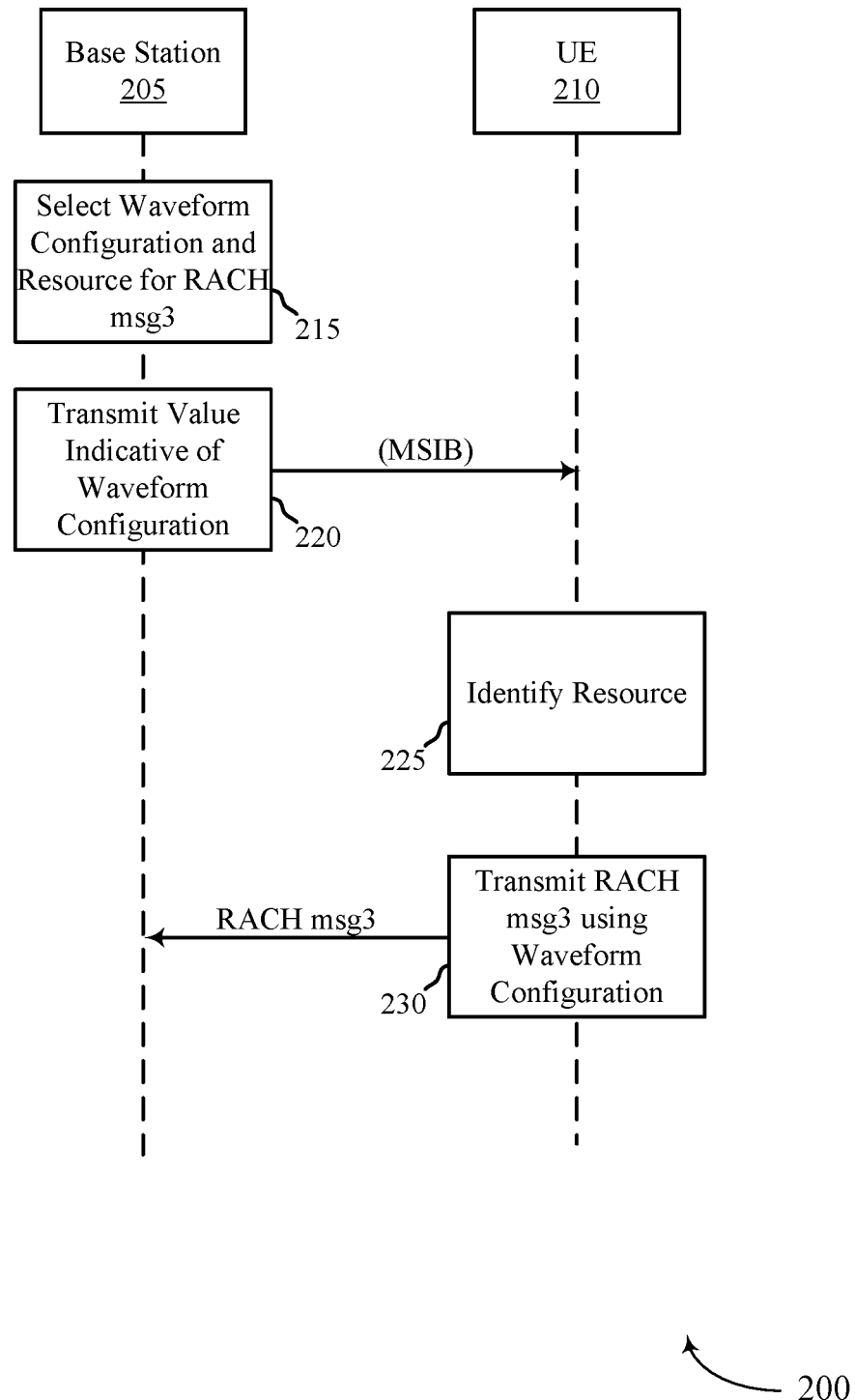
FIG. 2 illustrates an example of a process that supports joint encoding waveform and slot information, in accordance with one or more aspects of the present disclosure.

FIG. 2 illustrates an example of a process 200 that supports joint encoding waveform and slot information, in accordance with one or more aspects of the present disclosure. In some examples, process 200 may implement aspects of wireless communication system 100. Process 200 may include a base station 205 and a UE 210, which may be examples of the corresponding devices described herein.

Broadly, aspects of process 200 may include jointly encoding waveform information for a RACH msg3 and the resources used or the RACH msg3. Conventional protocols may include signaling the RACH msg3 waveform information (e.g., CP-OFDM and/or DFT-S-OFDM) by using bit(s) in a MSIB message. The duration of the RACH msg3 transmission (e.g., the time resources allocated for the RACH msg3 transmission) are typically signaled in in RACH msg2 (e.g., in the grant and/or payload of RACH msg2). However, process 200 may provide for the RAR signaling for the resource (e.g., slot, mini-slot) format of RACH msg3 as a function of the waveform configuration selected for the RACH msg3 transmission. For example, the base station 205 may select the resource based on the waveform configuration and/or may select the waveform configuration based on the resources needed. In some aspects, a CP-PFDM waveform configuration for the RACH msg3 may require (or provide) a higher number of resources (e.g., symbols) for the RACH msg3 transmission. In another aspects, a DFT-S-OFDM waveform configuration may require (or provide) a lower number of resources for the RACH msg3 transmission. Process 200 may provide for a higher number or combination of RACH msg3 waveform configurations and resources being conveyed using the same number of bits.

At 215, base station 205 may select a waveform configuration and a resource for a RACH msg3 transmission to UE 210. The RACH msg3 transmission may be associated with a RACH procedure between base station 205 and UE 210. The waveform configuration may generally provide a transmissions scheme for the RACH msg3 transmission scheme. In some aspects, the waveform configuration may include a CP-OFDM waveform configuration, a DFT-S-OFDM waveform configuration, and the like. The waveform configuration may associated with an uplink transmission of the RACH msg3 from UE 210 to base station 205. Generally, the waveform configuration may be associated with a particular set of resources such that conveying an indication of the waveform configuration also conveys an implicit indication of the resources, and vice versa.

In some aspects, the resource may be associated with time and/or frequency resources (e.g., slots, mini-slots, symbols, frequencies, tones, subcarriers, and the like). In some aspects, a slot may refer to a traditional slot comprising 14 symbols and a mini-slot may refer to a slot that has fewer than the traditional number of symbols (e.g., 2 symbols, 3 symbols, 7 symbols, etc.). Thus, the resource may be associated with the number of symbols that will be used for the RACH msg3 transmission.

In some aspects, the waveform configuration may be selected based on the resources to be used for the RACH msg3. For example, base station 205 may determine that the resources to use for the RACH msg3 transmission exceed a threshold value and select the waveform configuration based on the resource requirements (e.g., a DFT-S-OFDM waveform configuration). Similarly, base station 205 may determine that the resources to use for the RACH msg3 transmission are below the threshold value and select the waveform configuration based on the resource requirements (e.g., a CP-OFDM waveform configuration).

In some aspects, the resource may be selected based on the waveform configuration to be used for the RACH msg3. For example, base station 205 may determine that the DFT-S-OFDM waveform configuration is to be used of the RACH msg3 transmission (e.g., based on the link budget) and select the resources based on the waveform configuration. Similarly, base station 205 may determine that the CP-OFDM waveform configuration is to be used for the RACH msg3 transmission and select the resources based on the waveform configuration.

At 220, base station 205 may transmit (and UE 210 may receive) a value indicative of the waveform configuration. Base station 205 may transmit the value indicative of the waveform configuration to UE 210, wherein the waveform configuration is further indicative of the selected resource. The indication of the value may be transmitted in an information block message, e.g., a MIB, SIB, MSIB, OSIB, and the like. For example, base station 205 may configure bit(s) of the information block message to carry or otherwise convey the indication of the value.

In some aspects, base station 205 may determine that the configuring the bit(s) of the information block message only conveys a portion of the indication of the value. Accordingly, base station 205 may configure bit(s) of the RACH msg2 transmission to carry or otherwise convey the remaining indication of the indication of the resource. Thus, between the information block message and the RACH msg2, base station 205 may convey the full indication of the value indicative of the selected waveform configuration.

At 225, UE 210 may identify the resource to use for the RACH msg3 transmission based on the waveform configuration. For example, UE 210 may decode the value indicated in the information block message (and RACH msg2 when applicable) and access information associated with the waveform configuration/resource correspondence.

At 230, UE 210 may transmit (and base station 205 may receive) the RACH msg3 using the waveform configuration and resource. Thus, UE 210 may receive the jointly encoded waveform configuration and resource from base station 205 and, using this information, encode and transmit the RACH msg3 accordingly.

In some aspects, the features of process 200 may be extended to DMRS information conveyance. For example, if the resources to be used for the RACH msg3 transmission exceed a certain number, then a corresponding number of DMRS signals may be transmitted in the RACH msg3 transmission. Correspondingly, if the resources to be used for the RACH msg3 transmission are below number, then a reduced number of DMRS signals may be transmitted in the RACH msg3 transmission.

Figure 3:
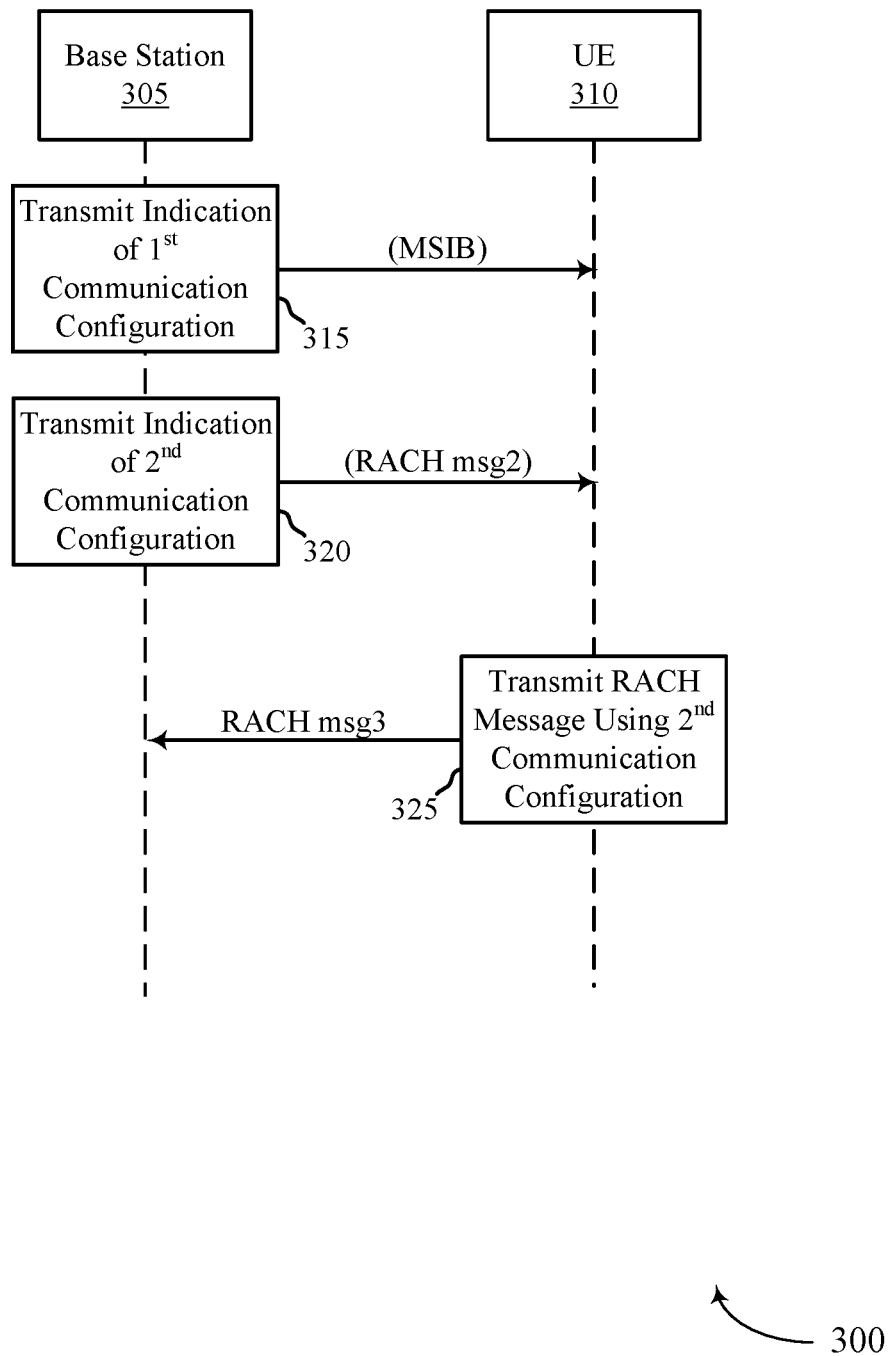
FIG. 3 illustrates an example of a process that supports joint encoding waveform and slot information, in accordance with one or more aspects of the present disclosure.

FIG. 3 illustrates an example of a process 300 that supports joint encoding waveform and slot information, in accordance with one or more aspects of the present disclosure. In some examples, process 300 may implement aspects of wireless communication system 100 and/or process 200. Process 300 may include a base station 305 and a UE 310, which may be examples of the corresponding devices described herein.

Generally, process 300 provide a mechanism for the signaling in RACH msg2 regarding RACH msg3 waveform configuration overwriting the signaling in the MSIB. For example, if the MSIB indicates that one waveform configuration (e.g., DFT-S-OFDM) is not supported for use in the cell, the RACH msg2 transmission may signal an indication to use that waveform configuration. UE 310 receiving the second signal in the RACH msg2 will ignore the MSIB signaling and use the waveform configuration signaled in RACH msg2.

In one non-limiting example, process 300 may be implemented in the scenario where base station 305 initially signals using bit(s) of the MSIB to use a first waveform configuration for the RACH msg3 transmission (e.g., CP-PFDM). After receiving RACH msg1, base station 305 may determine that the reference signal received power (RSRP) is below a threshold value. Based on the low RSRP, base station 305 may determine that a second waveform configuration is more suited for the RACH msg3 transmission. Accordingly, base station 305 may signal via RACH msg2 for UE 310 to use the second waveform configuration (e.g., DFT-S-OFDM) for the RACH msg3 transmission.

At 315, base station 305 may transmit (and UE 310 may receive) an indication of a first communication configuration. For example, base station 305 may transmit an information block message to UE 310 that carries or otherwise indicates the first communication configuration. The first communication configuration may be associated with a RACH procedure, e.g., RACH message(s) exchanged between base station 305 and UE 310. In some aspects, the RACH message may include a RACH msg3 transmission. In some aspects, the information block message may include a MIB, SIB, MSIB, OSIB, a remaining portion of the MSIB, and the like.

At 320, base station 305 may transmit (and UE 310 may receive) an indication of a second communication configuration. For example, base station 305 may transmit an initial RACH message during a RACH procedure that carries or otherwise conveys an indication of the second communication configuration. The second communication configuration may be associated with transmission of the RACH message. In some aspects, the indication of the second communication configuration may be transmitted in a RACH msg2 transmission.

In some aspects, the second communication configuration may be transmitted based on changing channel conditions between base station 305 and UE 310. For example, the communication link that base station 305 has with UE 310 may have degraded to a point that it is unable to support the first communication configuration. Accordingly, base station 305 may transmit the second communication configuration to signal UE 310 to use the second communication configuration.

In some aspects, the second communication configuration may be different from the first communication configuration. For example, the first communication configuration may be a CP-OFDM waveform configuration and the second communication configuration may be a DFT-S-OFDM waveform configuration. In another example, the first communication configuration may be a DFT-S-OFDM waveform configuration and the second communication configuration may be a CP-OFDM waveform configuration.

In some aspects, the communication configurations may be associated with retransmission parameters associated with the RACH message transmission. For example, the first communication configuration may associated with a first retransmission parameter (e.g., a configuration for signaling retransmission, a resource to use for the retransmission, etc.).

At 325, UE 310 may transmit (and base station 305 may receive) a RACH message using the second communication configuration. In some aspects, the RACH message may be a RACH msg3 transmission.

Figure 4:
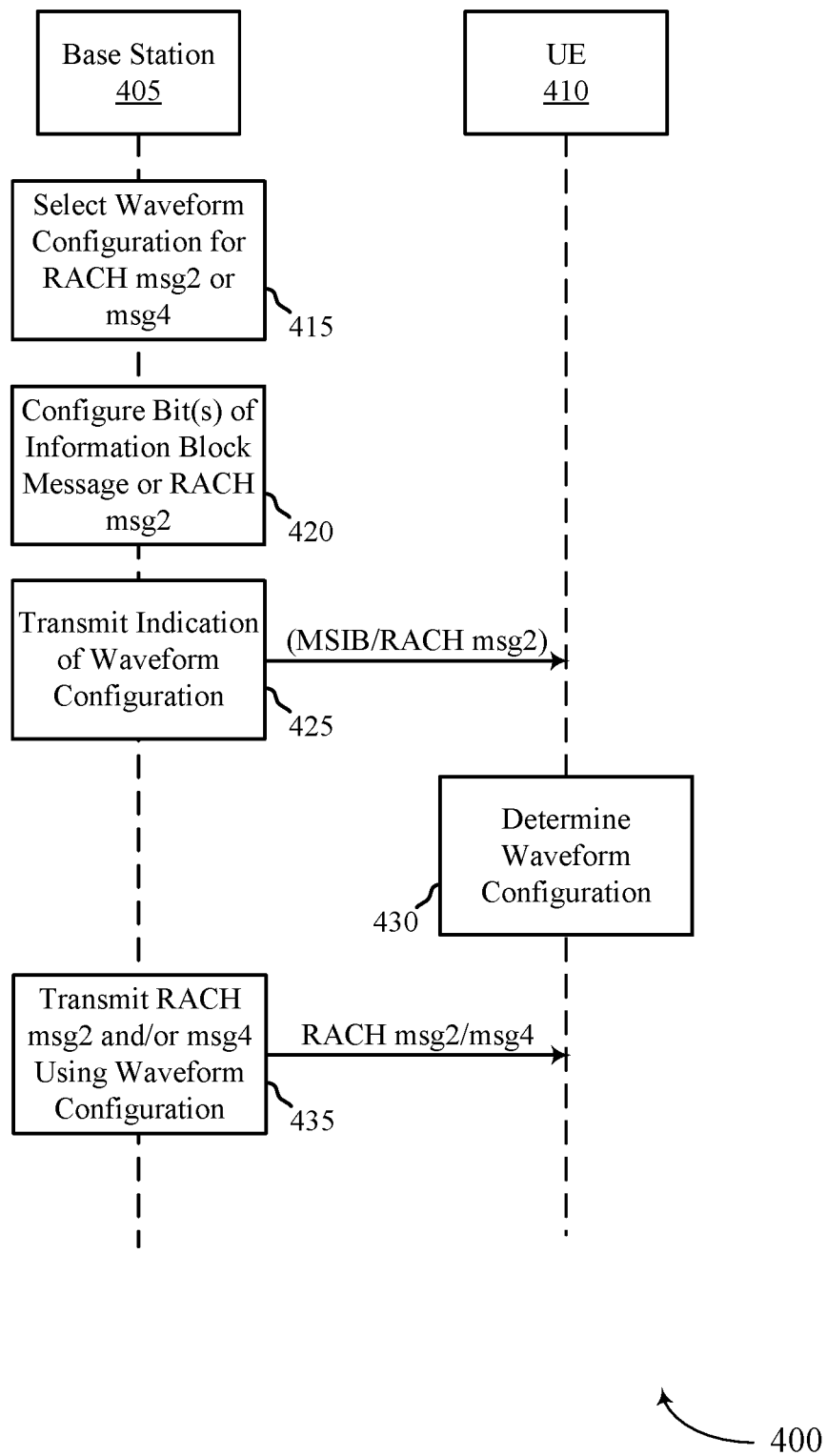
FIG. 4 illustrates an example of a process that supports joint encoding waveform and slot information, in accordance with one or more aspects of the present disclosure.

FIG. 4 illustrates an example of a process 400 that supports joint encoding waveform and slot information, in accordance with one or more aspects of the present disclosure. In some examples, process 400 may implement aspects of wireless communication system 100 and/or processes 200/300. Process 400 may include a base station 405 and a UE 410, which may be examples of the corresponding devices described herein.

Generally, process 400 may support base station 405 signaling the waveform for RACH msg2 transmission through the remaining bit(s) of the MSIB or through the PDCCH portion of RACH msg2. In some aspects, DFT-S-OFDM and/or CP-OFDM may be used for RACH msg2 when operating in the frequency ranges greater than 40 GHz, e.g., in mmW wireless communication systems.

At 415, base station 405 may select a waveform configuration for a RACH msg2 and/or a RACH msg4 to UE 410. The waveform configuration may include a CP-OFDM waveform configuration, a DFT-S-OFDM waveform configuration, and the like.

At 420, base station 405 may configure bit(s) of an information block message and/or the RACH msg2 to provide an indication of the selected waveform configuration. In some aspects, base station 405 may configure bit(s) of the PDCCH of the RACH msg2 to indicate the selected waveform configuration and/or may configure bit(s) of the information block message to indicate the selected waveform configuration. In some aspects, the configured bit(s) of the PDCCH of RACH msg2 and/or the bit(s) of the information block message may indicate the waveform configuration for both the RACH msg2 and the RACH msg4. In some aspects, the information block message may be a MIB, SIB, MSIB, OSIB, and/or remaining bit(s) of the MSIB.

At 425, base station 405 may transmit (and UE 410 may receive) an indication of the selected waveform configuration. For example, base station 405 may transmit the RACH msg2 including the PDCCH and/or transmit the information block message to indicate the selected waveform configuration.

At 430, UE 410 may determine or otherwise identify the waveform configuration. For example, UE 410 may determine or otherwise identify the waveform configuration based on the PDCCH of RACH msg2 and/or the information block message. In some aspects, UE 410 may decode bit(s) in the PDCCH of RACH msg2 and/or the information block message to determine the waveform configuration.

At 435, base station 405 may transmit (and UE 410 may receive) the RACH msg2 and/or RACH msg4 using the waveform configuration. That is, the RACH msg2 and/or RACH msg4 may be transmitted according to the waveform configuration indicated in the information block message and/or the RACH msg2 transmission.

Figure 5:
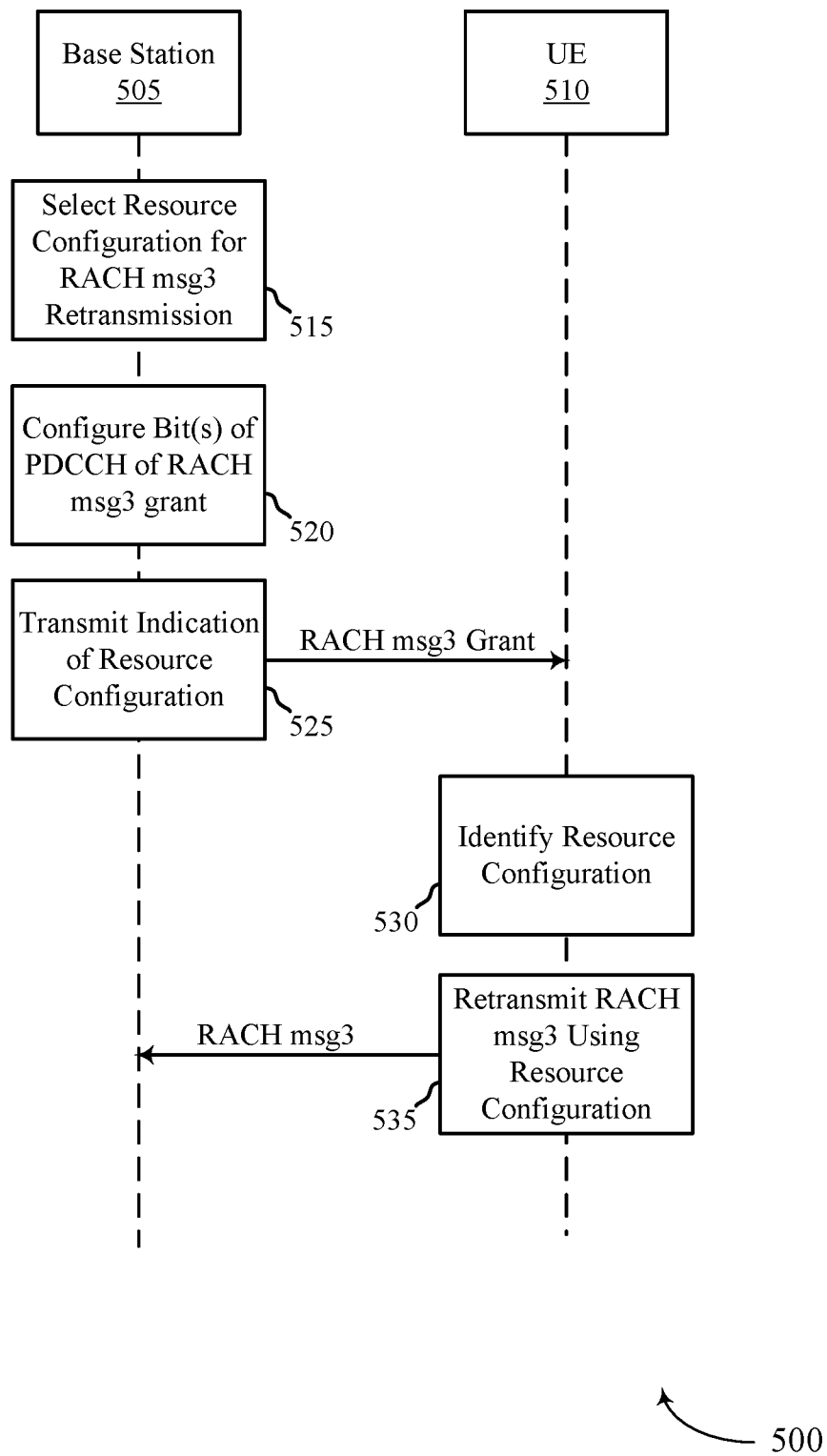
FIG. 5 illustrates an example of a process that supports joint encoding waveform and slot information, in accordance with one or more aspects of the present disclosure.

FIG. 5 illustrates an example of a process 500 that supports joint encoding waveform and slot information, in accordance with one or more aspects of the present disclosure. In some examples, process 500 may implement aspects of wireless communication system 100 and/or processes 200/300/400. Process 500 may include a base station 505 and a UE 510, which may be examples of the corresponding devices described herein.

Generally, process 500 may support aspects of the PDCCH of RACH msg2 signaling the downlink slot format of RACH msg2 and/or the RACH msg3 transmission/retransmission information (e.g., RACH msg3 waveform configuration, slot format, etc.). In some examples, the information in the PDCCH of RACH msg2 or a RACH msg3 grant may be repeated in the RACH msg2 payload or RACH msg3 payload, respectively, for reliability. In some aspects, bit(s) of each RAR record on waveform selection may be repeated for reliability. In one example, the PDCCH information may not be repeated in the physical downlink shared channel (PDSCH), which may support smaller PDSCH payload, base station 505 using a broader transmission beam, multiplexing more RAR messages on the broader transmission beam, etc. In another example, the PDCCH information is repeated in the PDSCH, which may support larger PDSCH payload, base station 505 using a more narrow transmission beam, multiplexing fewer UEs on the narrow transmission beam, etc. In some aspects, base station 505 may consider reliability, priority, number of UEs in the cell, and the like, when deciding whether to repeat the PDCCH information in the PDSCH payload of the RACH msg2 transmission.

At 515, base station 505 may select a resource configuration for a RACH msg3 retransmission. The resource configuration may indicate or otherwise be associated with time and/or frequency resources (e.g., slot configuration, mini-slot configuration, and the like). The resource configuration for the RACH msg3 retransmission may include time/frequency resources to use for the PDSCH payload portion of the RACH msg3 retransmission. In some aspects, the resource configuration includes a slot format for the RACH msg3 retransmission and/or a waveform configuration of the RACH msg3 retransmission, an uplink slot format for the RACH msg3 retransmission, and the like.

At 520, base station 505 may configure bit(s) of a PDCCH of the RACH msg3 grant to carry or otherwise convey an indication of the resource configuration. For example, base station 505 may configure bit(s) of the PDCCH of RACH msg3 grant to provide the indication of the resource configuration of the RACH msg3 retransmission. In some aspects, configuring the bits may also convey (e.g., implicitly) a beamforming patter used for retransmission of RACH msg3 and/or a number of UE multiplexed on the RACH msg3 retransmission.

At 525, base station 505 may transmit (and UE 510 may receive) the RACH msg3 grant carrying or otherwise providing an indication of the resource configuration. For example, the indication of the RACH msg3 retransmission may be provided in the PDCCH portion of the RACH msg3 grant transmission.

At 530, UE 510 may identify the resource configuration. For example, UE 510 may decode bit(s) of the PDCCH portion of the RACH msg3 grant to identify the resource configuration for retransmission of RACH msg3. As the resource configuration may indicate resources for the payload portion of the RACH msg3 retransmission, UE 510 may decode the payload portion (e.g., the PDSCH portion) of the RACH msg3 grant according to the resource configuration. In some aspects, the resource configuration decoded in the payload portion of the RACH msg3 grant transmission may carry or otherwise provide an indication of the resources used for the RACH msg3 retransmission.

At 535, UE 510 may retransmit (and base station 505 may receive) a RACH msg3 using the resource configuration. That is, UE 510 may use the resource configuration received in the RACH msg3 grant transmission to identify the resources (e.g., time and/or frequency) to use for retransmitting the RACH msg3.

Figure 6:
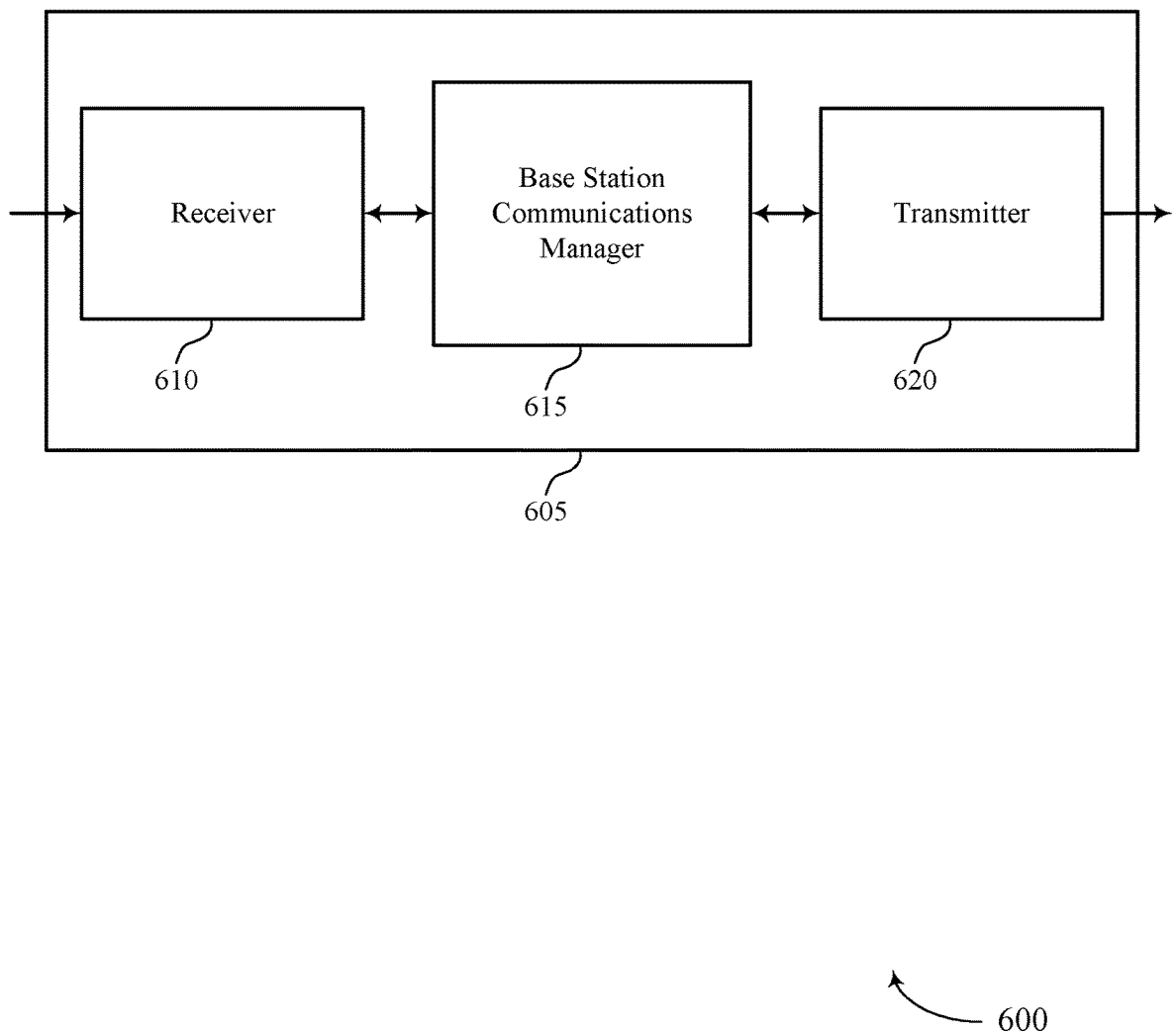
FIGS. 6 through 8 show block diagrams of a device that supports joint encoding waveform and slot information, in accordance with one or more aspects of the present disclosure.

FIG. 6 shows a block diagram 600 of a wireless device 605 that supports joint encoding waveform and slot information, in accordance with one or more aspects of the present disclosure. Wireless device 605 may be an example of aspects of a base station 105 as described herein. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to joint encoding waveform and slot information, etc.). Information may be passed on to other components of the device. The receiver 610 may be an example of aspects of the transceiver 935 described with reference to FIG. 9. The receiver 610 may utilize a single antenna or a set of antennas.

Base station communications manager 615 may be an example of aspects of the base station communications manager 915 described with reference to FIG. 9.

Base station communications manager 615 and/or at least some of its various sub-components may be implemented in hardware, software executed by a processor, firmware, or any combination thereof. If implemented in software executed by a processor, the functions of the base station communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 615 and/or at least some of its various sub-components may be physically located at various positions, including being distributed such that portions of functions are implemented at different physical locations by one or more physical devices. In some examples, base station communications manager 615 and/or at least some of its various sub-components may be a separate and distinct component in accordance with various aspects of the present disclosure. In other examples, base station communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some aspects, base station communications manager 615 may select a waveform configuration and a resource for a UE to use to transmit a RACH RACH msg3. Base station communications manager 615 may and transmit a value indicative of the waveform configuration to the UE, where the waveform configuration is further indicative of the selected resource.

In some aspects, base station communications manager 615 may transmit, to a UE, an information block message indicating that a first communication configuration is to be used for a RACH message transmission. Base station communications manager 615 may transmit, during a RACH procedure, an initial RACH message indicating that a second communication configuration is to be used for the RACH message transmission. Base station communications manager 615 may receive the RACH message transmitted according to the second communication configuration.

In some aspects, base station communications manager 615 may also select a waveform configuration to transmit a RACH msg2 or a RACH msg4 to a UE. Base station communications manager 615 may configure one or more bits of an information block message or the RACH msg2 to indicate the selected waveform configuration. Base station communications manager 615 may transmit an information block message or the RACH msg2 to the UE that indicates the selected waveform configuration.

In some aspects, base station communications manager 615 may select a resource configuration for a RACH msg3 retransmission. Base station communications manager 615 may configure one or more bits of a PDCCH portion of the RACH RACH msg3 grant to indicate the resource configuration. Base station communications manager 615 may transmit the RACH msg3 grant including the configured PDCCH portion to provide the indication of the resource configuration. Base station communications manager 615 may receive a retransmission of the RACH msg3 according to the resource configuration.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
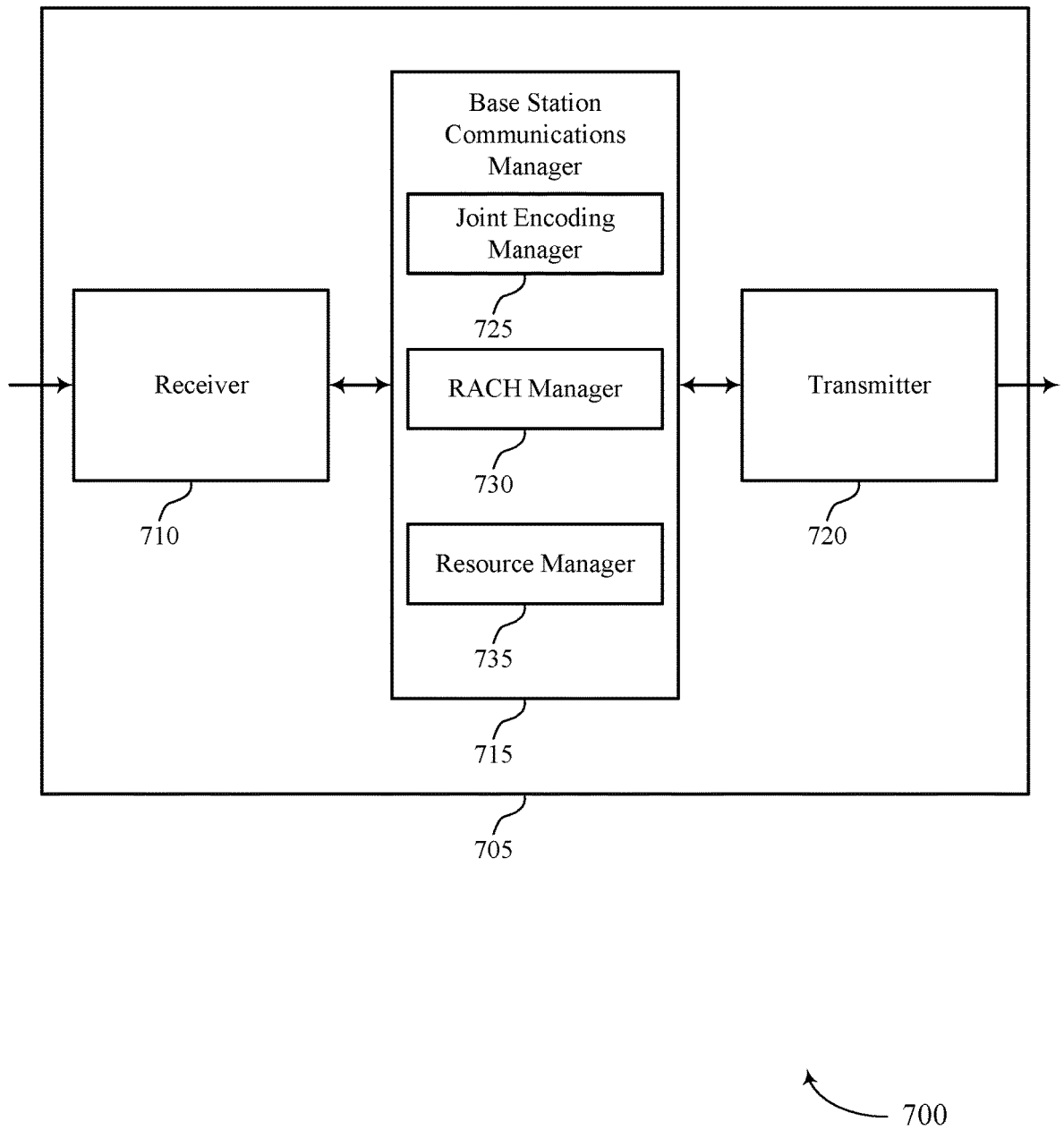

FIG. 7 shows a block diagram 700 of a wireless device 705 that supports joint encoding waveform and slot information, in accordance with one or more aspects of the present disclosure. Wireless device 705 may be an example of aspects of a wireless device 605 or a base station 105 as described herein. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to joint encoding waveform and slot information, etc.). Information may be passed on to other components of the device. The receiver 710 may be an example of aspects of the transceiver 935 described with reference to FIG. 9. The receiver 710 may utilize a single antenna or a set of antennas.

Base station communications manager 715 may be an example of aspects of the base station communications manager 915 described with reference to FIG. 9. Base station communications manager 715 may also include joint encoding manager 725, RACH manager 730, and resource manager 735.

Joint encoding manager 725 may select a waveform configuration and a resource for a UE to use to transmit a RACH msg3. Joint encoding manager 725 may configure at least a portion of a RACH msg2 to convey a remaining portion of the indication of the resource. Joint encoding manager 725 may configure one or more bits of an information block message or the RACH msg2 to indicate the selected waveform configuration. Joint encoding manager 725 may configure one or more bits of a PDCCH portion of the RACH msg2 to indicate the selected waveform configuration. Joint encoding manager 725 may configure one or more bits of a MSIB message to indicate the selected waveform configuration. Joint encoding manager 725 may determine that the selected waveform configuration indicates a portion of the indication of the resource. Joint encoding manager 725 may configure one or more bits of the information block message or the RACH msg2 to indicate the selected waveform configuration for both the RACH msg2 and the RACH RACH msg4. Joint encoding manager 725 may configure one or more bits of a PDCCH portion of the RACH msg2 to indicate the resource configuration. Joint encoding manager 725 may configure one or more bits of a payload portion of the RACH msg2 to provide the indication of the resource configuration of the RACH RACH msg3. Joint encoding manager 725 may determine whether at least one of a reliability metric or a priority level associated with the RACH msg2 and the RACH msg3 has exceeded a threshold level and configure, based on the determining, one or more bits of a payload portion of the RACH msg2 to provide the indication of the resource configuration. Joint encoding manager 725 may configure one or more bits of a MSIB message and one or more bits of a PDCCH portion of the RACH msg2 to indicate the selected waveform configuration. In some cases, the resource configuration includes a waveform configuration for the RACH msg3, an uplink slot format for the RACH msg3, or combinations thereof. In some cases, the waveform configuration is selected based on the selected resource. In some cases, the resource is selected based on the selected waveform configuration. In some cases, the configured one or more bits provide an implicit indication of one or more of a beamforming pattern used for transmission of the RACH msg2 and a number of user equipment multiplexed on the RACH msg2.

RACH manager 730 may transmit a value indicative of the waveform configuration to the UE, where the waveform configuration is further indicative of the selected resource. RACH manager 730 may transmit, to a UE, an information block message indicating that a first communication configuration is to be used for a RACH message transmission. RACH manager 730 may transmit, during a RACH procedure, an initial RACH message indicating that a second communication configuration is to be used for the RACH message transmission. RACH manager 730 may receive the RACH message transmitted according to the second communication configuration. RACH manager 730 may determine that a communication link with the UE has degraded and is unable to support the first communication configuration, where the initial RACH message indicating the second communication configuration is transmitted based on the degraded communication link. RACH manager 730 may transmit an information block message or the RACH msg2 to the UE that indicates the selected waveform configuration. RACH manager 730 may transmit the RACH msg2 including the configured PDCCH portion to provide the indication of the resource configuration. RACH manager 730 may receive a RACH msg3 transmission from a UE, the RACH msg3 transmitted according to the resource configuration. In some cases, the resource configuration of the RACH msg3 includes a waveform configuration for the RACH msg3, an uplink slot format for the RACH msg3, or combinations thereof. In some cases, the first communication configuration includes a CP-OFDM waveform configuration, and the second communication configuration includes a DFT-S-OFDM waveform configuration. In some cases, the first communication configuration includes a DFT-S-OFDM waveform configuration, and the second communication configuration includes a CP-OFDM waveform configuration. In some cases, the value indication is transmitted in at least one of a MIB, a SIB, a MSIB, or an OSIB. In some cases, the RACH message includes a RACH msg3 and the initial RACH message includes a RACH msg2. In some cases, the waveform configuration for the RACH msg2 or the RACH msg3 includes at least one of a CP-OFDM waveform configuration or a DFT-S-OFDM waveform configuration. In some cases, the information block message includes at least one of a MIB, a SIB, or a MSIB, an OSIB, or a remaining portion of a MSIB.

Resource manager 735 may determine, based on the waveform configuration including a DFT-S-OFDM waveform configuration, that the resource includes a number of time-frequency resources exceeding a threshold level. Resource manager 735 may determine, based on the waveform configuration including CP-OFDM waveform configuration, that the resource includes a number of time-frequency resources below a threshold level. Resource manager 735 may select a waveform configuration to transmit a RACH msg2 or a RACH msg4 to a UE. Resource manager 735 may select a resource configuration for a RACH msg3 retransmission. In some cases, the resource includes at least one of a time resource, a frequency resource, or a time-frequency resource. In some cases, the time resource includes a number of symbols associated with the RACH msg3 retransmission. In some cases, the resource configuration includes at least one of a time resource, a frequency resource, or a time-frequency resource. In some cases, the time resource includes at least one of a slot configuration or a mini-slot configuration. In some cases, the resource configuration includes an uplink slot format for the RACH msg3 retransmission.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
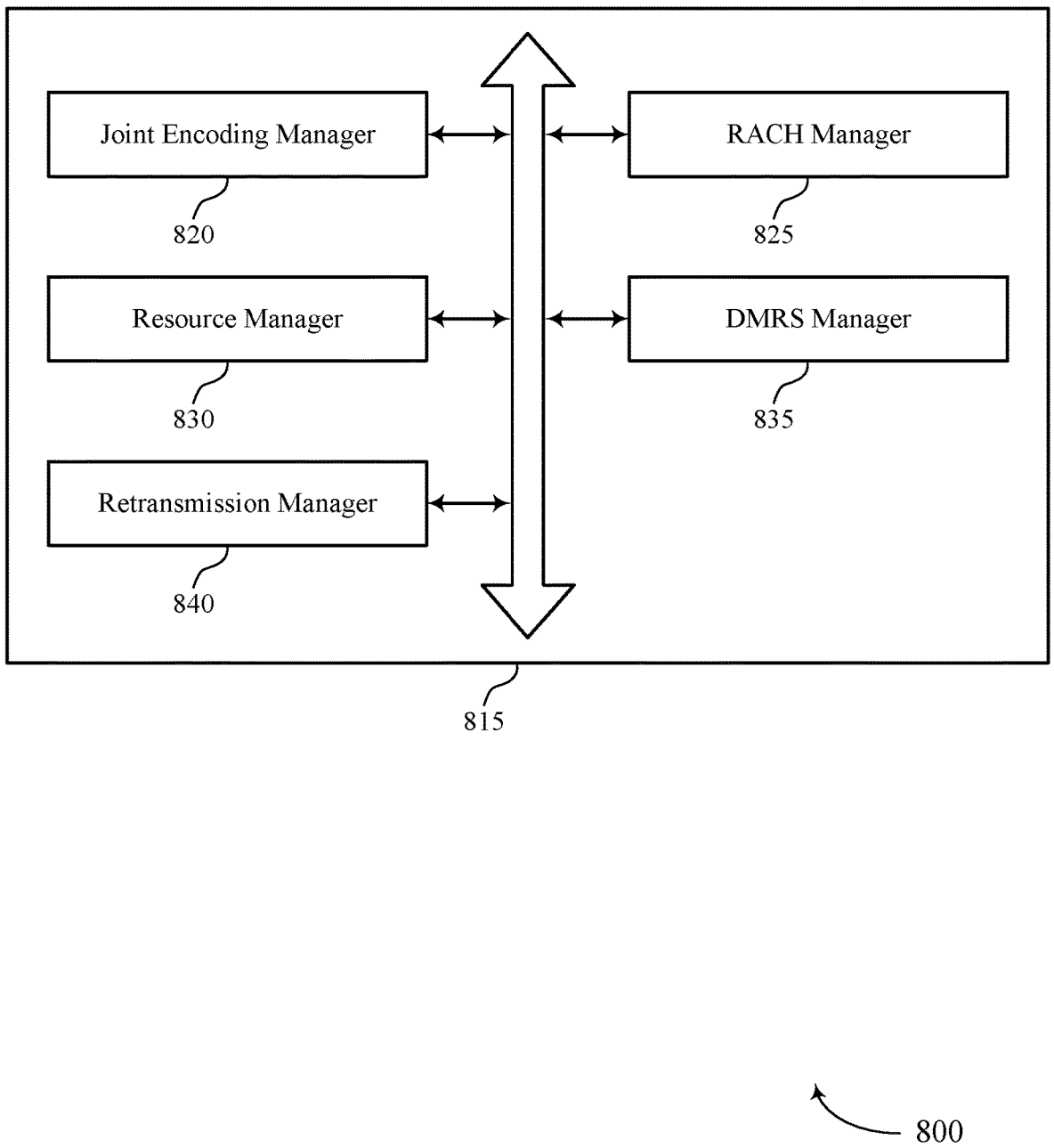

FIG. 8 shows a block diagram 800 of a base station communications manager 815 that supports joint encoding waveform and slot information, in accordance with one or more aspects of the present disclosure. The base station communications manager 815 may be an example of aspects of a base station communications manager 615, a base station communications manager 715, or a base station communications manager 915 described with reference to FIGS. 6, 7, and 9. The base station communications manager 815 may include joint encoding manager 820, RACH manager 825, resource manager 830, DMRS manager 835, and retransmission manager 840. Each of these modules may communicate, directly or indirectly, with one another (e.g., via one or more buses).

Joint encoding manager 820 may select a waveform configuration and a resource for a UE to use to transmit a RACH RACH msg3. Joint encoding manager 820 may configure at least a portion of a RACH msg2 to convey a remaining portion of the indication of the resource. Joint encoding manager 820 may configure one or more bits of an information block message or the RACH msg2 to indicate the selected waveform configuration. Joint encoding manager 820 may configure one or more bits of a PDCCH portion of the RACH msg2 to indicate the selected waveform configuration. Joint encoding manager 820 may configure one or more bits of a MSIB message to indicate the selected waveform configuration. Joint encoding manager 820 may determine that the selected waveform configuration indicates a portion of the indication of the resource. Joint encoding manager 820 may configure one or more bits of the information block message or the RACH msg2 to indicate the selected waveform configuration for both the RACH msg2 and the RACH RACH msg4. Joint encoding manager 820 may configure one or more bits of a PDCCH portion of the RACH msg2 to indicate the resource configuration. Joint encoding manager 820 may configure one or more bits of a payload portion of the RACH msg2 to provide the indication of the resource configuration of the RACH RACH msg3. Joint encoding manager 820 may determine whether at least one of a reliability metric or a priority level associated with the RACH msg2 and the RACH msg3 has exceeded a threshold level and configure, based on the determining, one or more bits of a payload portion of the RACH msg2 to provide the indication of the resource configuration. Joint encoding manager 820 may configure one or more bits of a MSIB message and one or more bits of a PDCCH portion of the RACH msg2 to indicate the selected waveform configuration. In some cases, the resource configuration includes a waveform configuration for the RACH msg3, an uplink slot format for the RACH msg3, or combinations thereof. In some cases, the waveform configuration is selected based on the selected resource. In some cases, the resource is selected based on the selected waveform configuration. In some cases, the configured one or more bits provide an implicit indication of one or more of a beamforming pattern used for transmission of the RACH msg2 and a number of user equipment multiplexed on the RACH msg2.

RACH manager 825 may transmit a value indicative of the waveform configuration to the UE, where the waveform configuration is further indicative of the selected resource. RACH manager 825 may transmit, to a UE, an information block message indicating that a first communication configuration is to be used for a RACH message transmission. RACH manager 825 may transmit, during a RACH procedure, an initial RACH message indicating that a second communication configuration is to be used for the RACH message transmission. RACH manager 825 may receive the RACH message transmitted according to the second communication configuration. RACH manager 825 may determine that a communication link with the UE has degraded and is unable to support the first communication configuration, where the initial RACH message indicating the second communication configuration is transmitted based on the degraded communication link. RACH manager 825 may transmit an information block message or the RACH msg2 to the UE that indicates the selected waveform configuration. RACH manager 825 may transmit the RACH msg2 including the configured PDCCH portion to provide the indication of the resource configuration. RACH manager 825 may receive a RACH msg3 transmission from a UE, the RACH msg3 transmitted according to the resource configuration. In some cases, the resource configuration of the RACH msg3 includes a waveform configuration for the RACH msg3, an uplink slot format for the RACH msg3, or combinations thereof. In some cases, the first communication configuration includes a CP-OFDM waveform configuration, and the second communication configuration includes a DFT-S-OFDM waveform configuration. In some cases, the first communication configuration includes a DFT-S-OFDM waveform configuration, and the second communication configuration includes a CP-OFDM waveform configuration. In some cases, the value indication is transmitted in at least one of a MIB, a SIB, a MSIB, or an OSIB. In some cases, the RACH message includes a RACH msg3 and the initial RACH message includes a RACH msg2. In some cases, the waveform configuration for the RACH msg2 or the RACH msg3 includes at least one of a CP-OFDM waveform configuration or a DFT-S-OFDM waveform configuration. In some cases, the information block message includes at least one of a MIB, a SIB, or a MSIB, an OSIB, or a remaining portion of a MSIB.

Resource manager 830 may determine, based on the waveform configuration including a DFT-S-OFDM waveform configuration, that the resource includes a number of time-frequency resources exceeding a threshold level. Resource manager 830 may determine, based on the waveform configuration including CP-OFDM waveform configuration, that the resource includes a number of time-frequency resources below a threshold level. Resource manager 830 may select a waveform configuration to transmit a RACH msg2 or a RACH msg4 to a UE. Resource manager 830 may select a resource configuration for a RACH msg3 retransmission. In some cases, the resource includes at least one of a time resource, a frequency resource, or a time-frequency resource. In some cases, the time resource includes a number of symbols associated with the RACH msg3 retransmission. In some cases, the resource configuration includes at least one of a time resource, a frequency resource, or a time-frequency resource. In some cases, the time resource includes at least one of a slot configuration or a mini-slot configuration. In some cases, the resource configuration includes an uplink slot format for the RACH msg3 retransmission.

DMRS manager 835 may determine, based on the resource, a number of DMRS to be transmitted in the RACH msg3 transmission, where the selected waveform configuration further indicates the number of DMRS.

Retransmission manager 840 may monitor, control, or otherwise manage aspects of the first communication configuration including a first retransmission parameter associated with a RACH msg3 transmission, and the second communication configuration includes a second retransmission parameter associated with the RACH msg3 transmission.

Figure 9:
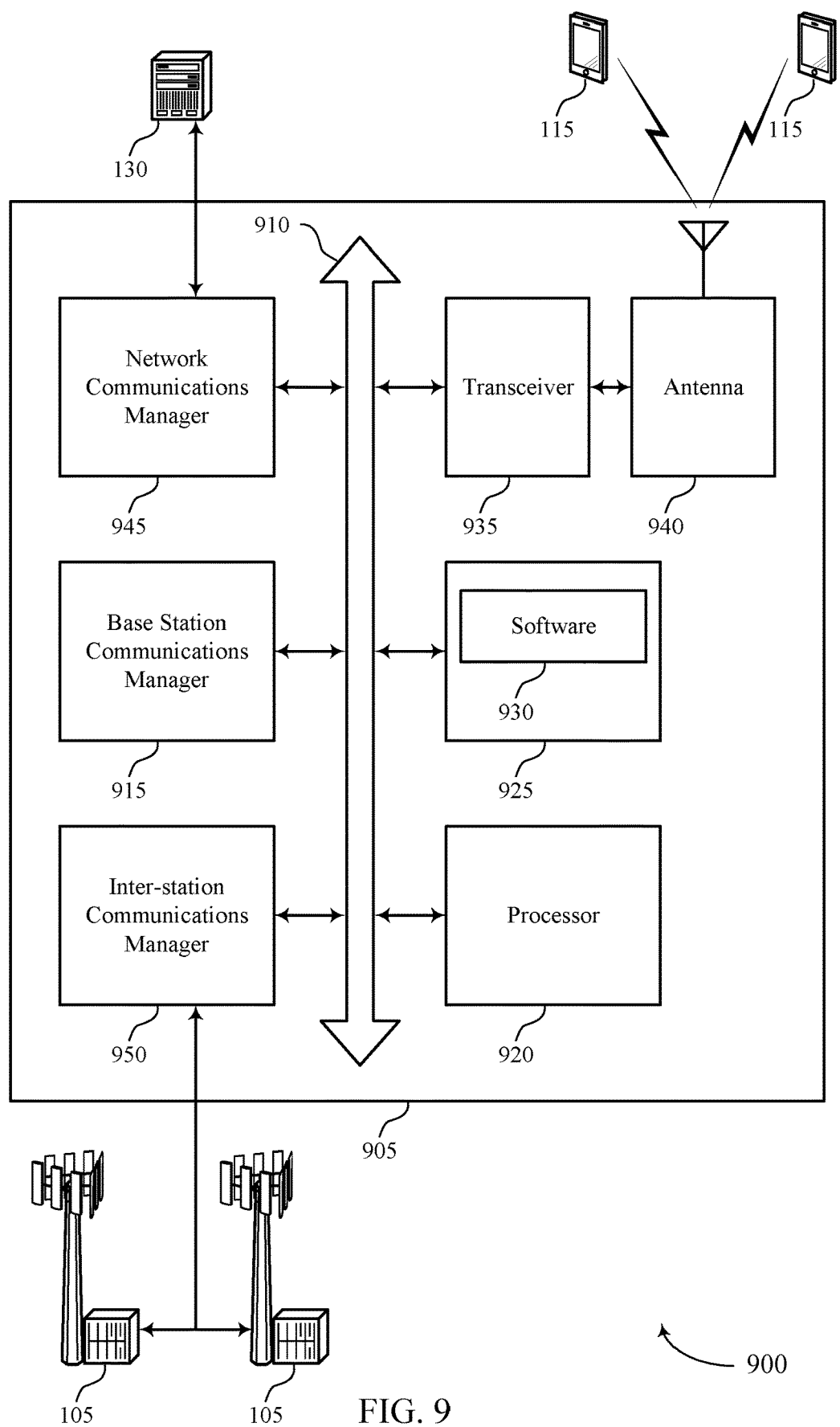
FIG. 9 illustrates a block diagram of a system including a base station that supports joint encoding waveform and slot information, in accordance with one or more aspects of the present disclosure.

FIG. 9 shows a diagram of a system 900 including a device 905 that supports joint encoding waveform and slot information, in accordance with one or more aspects of the present disclosure. Device 905 may be an example of or include the components of wireless device 605, wireless device 705, or a base station 105 as described herein. Device 905 may include components for bi-directional voice and data communications including components for transmitting and receiving communications, including base station communications manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more UEs 115.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting joint encoding waveform and slot information).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support joint encoding waveform and slot information. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within an Long Term Evolution (LTE)/LTE-A wireless communication network technology to provide communication between base stations 105.

Figure 10:
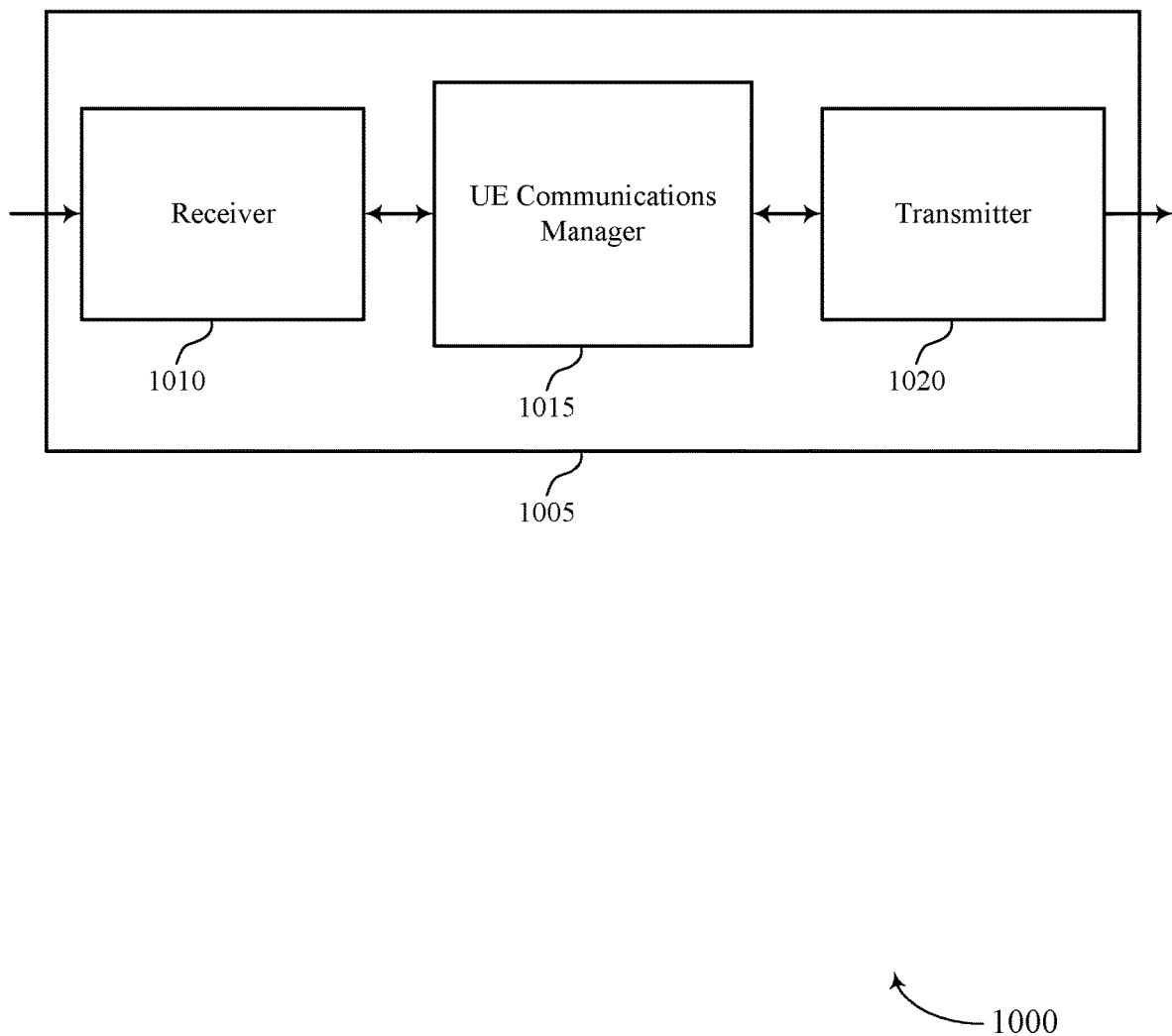
FIGS. 10 through 12 show block diagrams of a device that supports joint encoding waveform and slot information, in accordance with one or more aspects of the present disclosure.

FIG. 10 shows a block diagram 1000 of a wireless device 1005 that supports joint encoding waveform and slot information, in accordance with one or more aspects of the present disclosure. Wireless device 1005 may be an example of aspects of a UE 115 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to joint encoding waveform and slot information, etc.). Information may be passed on to other components of the device. The receiver 1010 may be an example of aspects of the transceiver 1335 described with reference to FIG. 13. The receiver 1010 may utilize a single antenna or a set of antennas.

UE communications manager 1015 may be an example of aspects of the UE communications manager 1315 described with reference to FIG. 13.

UE communications manager 1015 and/or at least some of its various sub-components may be implemented in hardware, software executed by a processor, firmware, or any combination thereof. If implemented in software executed by a processor, the functions of the UE communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some aspects, UE communications manager 1015 may receive a value indicative of a waveform configuration to use for uplink transmission of a RACH RACH msg3. UE communications manager 1015 may identify, based on the waveform configuration, a resource to use to transmit the RACH RACH msg3. UE communications manager 1015 may transmit the RACH msg3 using the identified resource and according to the waveform configuration.

In some aspects, UE communications manager 1015 may receive an information block message indicating that a first communication configuration is to be used for a RACH message transmission. UE communications manager 1015 may receive, during a RACH procedure, an initial RACH message indicating that a second communication configuration is to be used for the RACH message. UE communications manager 1015 may transmit the RACH message according to the second communication configuration.

In some aspects, UE communications manager 1015 may receive at least one of an information block message or a RACH msg2 from a base station, the information block message or the RACH msg2 including an indication of a selected waveform configuration to be used to transmit the RACH msg2 or a RACH RACH msg4. UE communications manager 1015 may determine the selected waveform configuration based on the indication in the information block message or the RACH RACH msg2. UE communications manager 1015 may receive at least one of the RACH msg2 or the RACH msg4 according to the waveform configuration.

In some aspects, UE communications manager 1015 may receive a RACH msg3 grant from a base station. UE communications manager 1015 may decode one or more bits of a PDCCH portion of the RACH msg3 grant to identify a resource configuration for retransmission of a RACH msg3. UE communications manager 1015 may retransmit the RACH msg3 according to the resource configuration.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
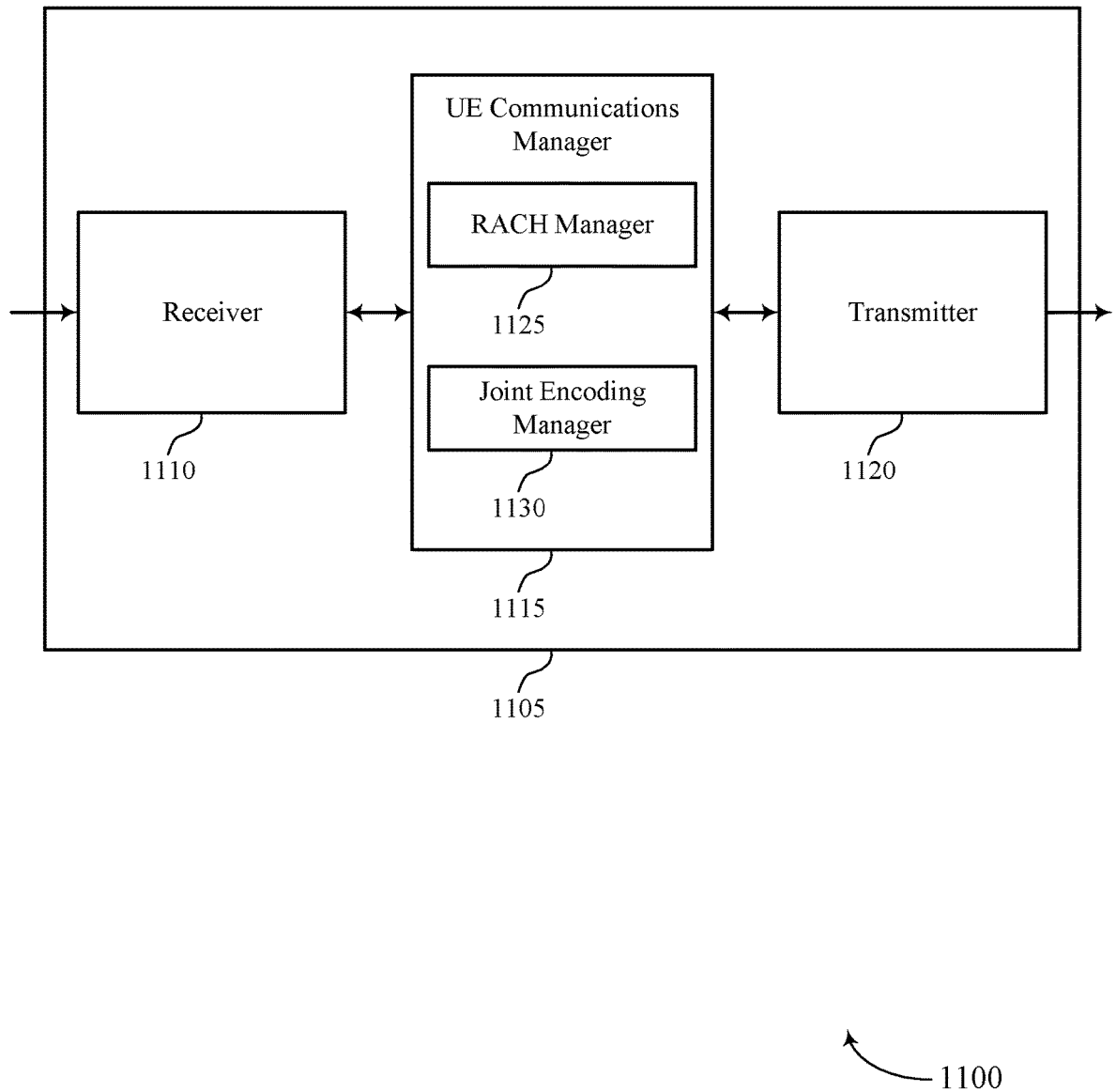

FIG. 11 shows a block diagram 1100 of a wireless device 1105 that supports joint encoding waveform and slot information, in accordance with one or more aspects of the present disclosure. Wireless device 1105 may be an example of aspects of a wireless device 1005 or a UE 115 as described herein. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to joint encoding waveform and slot information, etc.). Information may be passed on to other components of the device. The receiver 1110 may be an example of aspects of the transceiver 1335 described with reference to FIG. 13. The receiver 1110 may utilize a single antenna or a set of antennas.

UE communications manager 1115 may be an example of aspects of the UE communications manager 1315 described with reference to FIG. 13. UE communications manager 1115 may also include RACH manager 1125 and joint encoding manager 1130.

RACH manager 1125 may receive a value indicative of a waveform configuration to use for uplink transmission of a RACH RACH msg3. RACH manager 1125 may receive an information block message indicating that a first communication configuration is to be used for a RACH message transmission. RACH manager 1125 may receive, during a RACH procedure, an initial RACH message indicating that a second communication configuration is to be used for the RACH message. RACH manager 1125 may transmit the RACH message according to the second communication configuration. RACH manager 1125 may transmit the RACH msg3 using the identified resource and according to the waveform configuration. RACH manager 1125 may receive at least one of an information block message or a RACH msg2 from a base station, the information block message or the RACH msg2 including an indication of a selected waveform configuration to be used to transmit the RACH msg2 or a RACH msg4. RACH manager 1125 may receive at least one of the RACH msg2 or the RACH msg4 according to the waveform configuration. RACH manager 1125 may receive a RACH msg2 from a base station. RACH manager 1125 may retransmit the RACH msg3 according to the resource configuration. In some cases, the resource configuration includes a downlink slot format for the RACH msg2. In some cases, the first communication configuration includes a CP-OFDM waveform configuration, and the second communication configuration includes a DFT-S-OFDM waveform configuration. In some cases, the first communication configuration includes a DFT-S-OFDM waveform configuration, and the second communication configuration includes a CP-OFDM waveform configuration.

Joint encoding manager 1130 may identify, based on the waveform configuration, a resource to use to transmit the RACH RACH msg3. Joint encoding manager 1130 may decode one or more bits of a payload portion of the RACH msg2 to identify the indication of the resource configuration of the RACH RACH msg3. Joint encoding manager 1130 may decode at least a portion of an information block message or a RACH msg2 that conveys a remaining portion of the indication of the resource. Joint encoding manager 1130 may determine the selected waveform configuration based on the indication in the information block message or the RACH RACH msg2. Joint encoding manager 1130 may decode one or more bits of a PDCCH portion of the RACH msg2 to determine the indication the selected waveform configuration. Joint encoding manager 1130 may determine that the selected waveform configuration indicates a portion of the indication of the resource. Joint encoding manager 1130 may decode one or more bits of a MSIB message and one or more bits of a PDCCH portion of the RACH msg2 to determine the indication the selected waveform configuration. Joint encoding manager 1130 may decode one or more bits of the information block message or the RACH msg2 to determine the indication the selected waveform configuration for both the RACH msg2 and the RACH RACH msg4. Joint encoding manager 1130 may decode one or more bits of a PDCCH portion of the RACH msg3 grant to identify a resource configuration for retransmission of a RACH msg3. Joint encoding manager 1130 may decode a payload portion of the RACH msg2 according to the resource configuration. Joint encoding manager 1130 may decode one or more bits of a MSIB message to determine the indication of the selected waveform configuration. In some cases, the waveform configuration includes at least one of a CP-OFDM waveform configuration or a DFT-S-OFDM waveform configuration.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
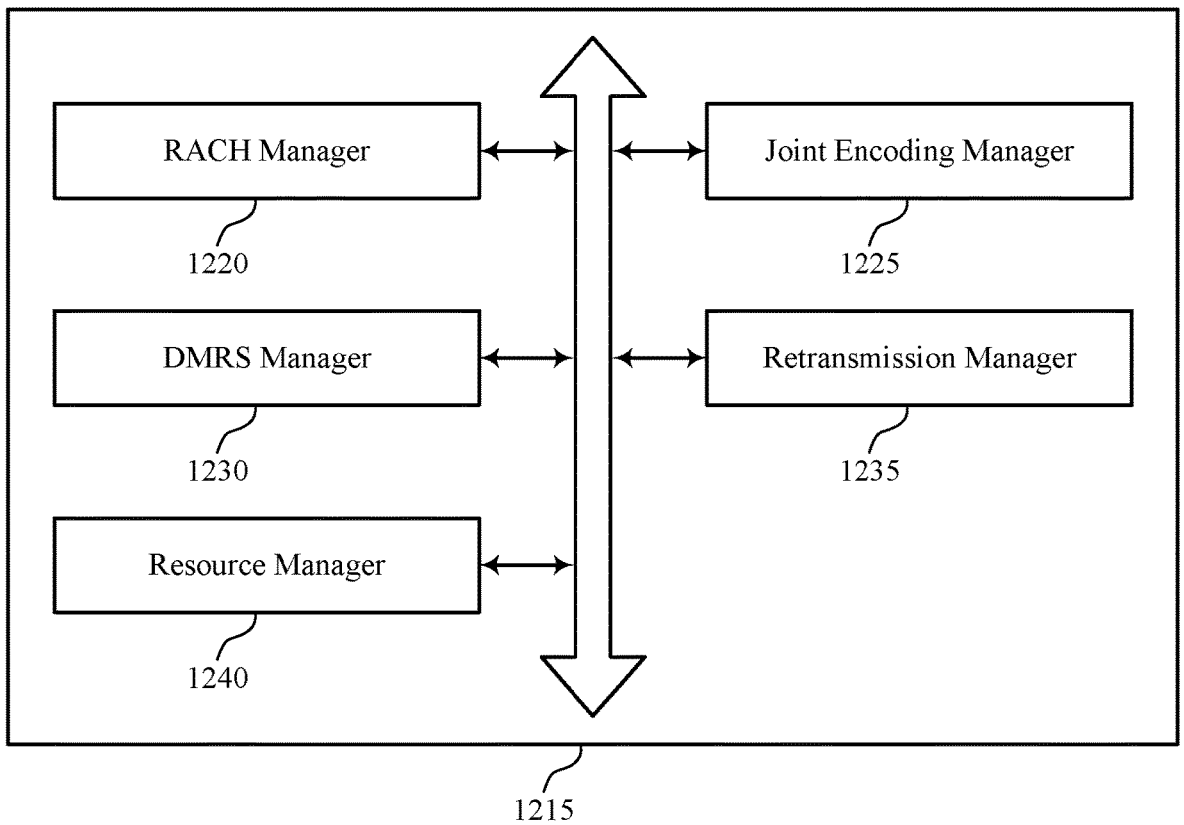

FIG. 12 shows a block diagram 1200 of a UE communications manager 1215 that supports joint encoding waveform and slot information, in accordance with one or more aspects of the present disclosure. The UE communications manager 1215 may be an example of aspects of a UE communications manager 1315 described with reference to FIGS. 10, 11, and 13. The UE communications manager 1215 may include RACH manager 1220, joint encoding manager 1225, DMRS manager 1230, retransmission manager 1235, and resource manager 1240. Each of these modules may communicate, directly or indirectly, with one another (e.g., via one or more buses).

RACH manager 1220 may receive a value indicative of a waveform configuration to use for uplink transmission of a RACH msg3. RACH manager 1220 may receive an information block message indicating that a first communication configuration is to be used for a RACH message transmission. RACH manager 1220 may receive, during a RACH procedure, an initial RACH message indicating that a second communication configuration is to be used for the RACH message. RACH manager 1220 may transmit the RACH message according to the second communication configuration. RACH manager 1220 may transmit the RACH msg3 using the identified resource and according to the waveform configuration. RACH manager 1220 may receive at least one of an information block message or a RACH msg2 from a base station, the information block message or the RACH msg2 including an indication of a selected waveform configuration to be used to transmit the RACH msg2 or a RACH msg4. RACH manager 1220 may receive at least one of the RACH msg2 or the RACH msg4 according to the waveform configuration. RACH manager 1220 may receive a RACH msg2 from a base station. RACH manager 1220 may retransmit the RACH msg3 according to the resource configuration. In some cases, the resource configuration includes a downlink slot format for the RACH msg2. In some cases, the first communication configuration includes a CP-OFDM waveform configuration, and the second communication configuration includes a DFT-S-OFDM waveform configuration. In some cases, the first communication configuration includes a DFT-S-OFDM waveform configuration, and the second communication configuration includes a CP-OFDM waveform configuration.

Joint encoding manager 1225 may identify, based on the waveform configuration, a resource to use to transmit the RACH msg3. Joint encoding manager 1225 may decode one or more bits of a payload portion of the RACH msg2 to identify the indication of the resource configuration of the RACH msg3. Joint encoding manager 1225 may decode at least a portion of an information block message or a RACH msg2 that conveys a remaining portion of the indication of the resource. Joint encoding manager 1225 may determine the selected waveform configuration based on the indication in the information block message or the RACH RACH msg2. Joint encoding manager 1225 may decode one or more bits of a PDCCH portion of the RACH msg2 to determine the indication the selected waveform configuration. Joint encoding manager 1225 may determine that the selected waveform configuration indicates a portion of the indication of the resource. Joint encoding manager 1225 may decode one or more bits of a MSIB message and one or more bits of a PDCCH portion of the RACH msg2 to determine the indication the selected waveform configuration. Joint encoding manager 1225 may decode one or more bits of the information block message or the RACH msg2 to determine the indication the selected waveform configuration for both the RACH msg2 and the RACH RACH msg4. Joint encoding manager 1225 may decode one or more bits of a PDCCH portion of the RACH msg3 grant to identify a resource configuration for retransmission of a RACH msg3. Joint encoding manager 1225 may decode a payload portion of the RACH msg3 grant according to the resource configuration. Joint encoding manager 1225 may decode one or more bits of a MSIB message to determine the indication of the selected waveform configuration. In some cases, the waveform configuration includes at least one of a CP-OFDM waveform configuration or a DFT-S-OFDM waveform configuration.

DMRS manager 1230 may determine, based on the resource, a number of DMRS to transmit in the RACH msg3 transmission and transmit the determined number of DMRS.

Retransmission manager 1235 may monitor, control, or otherwise manage aspects of the first communication/resource configuration includes a first retransmission parameter associated with a RACH msg3 retransmission, and the second communication/resource configuration includes a second retransmission parameter associated with the RACH msg3 retransmission.

Resource manager 1240 may monitor, control, or otherwise manage aspects of the one or more bits providing an implicit indication of one or more of a beamforming pattern used for transmission of the RACH msg2 and a number of UE multiplexed on the RACH msg2.

Figure 13:
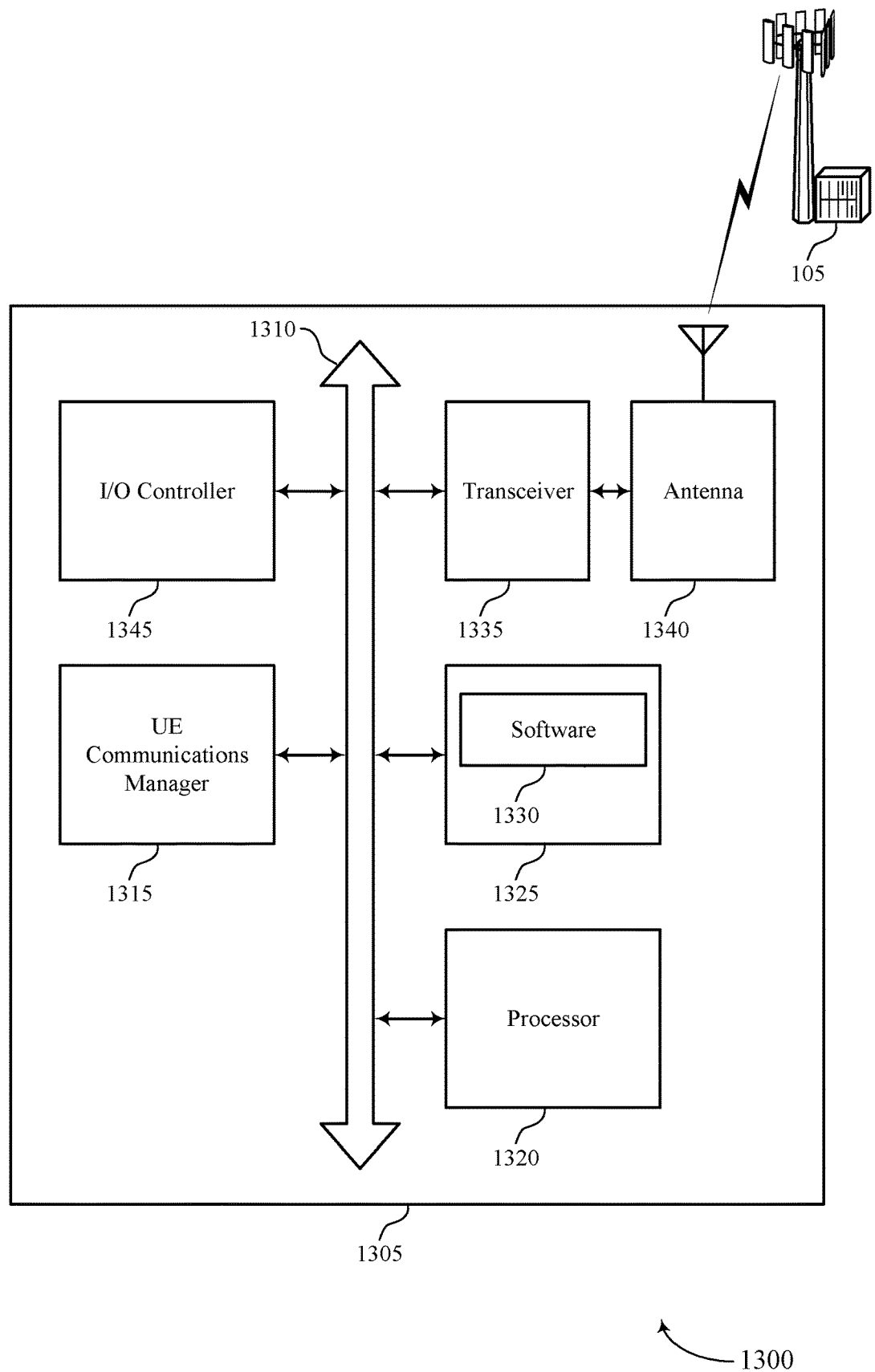
FIG. 13 illustrates a block diagram of a system including a UE that supports joint encoding waveform and slot information, in accordance with one or more aspects of the present disclosure.

FIG. 13 shows a diagram of a system 1300 including a device 1305 that supports joint encoding waveform and slot information, in accordance with one or more aspects of the present disclosure. Device 1305 may be an example of or include the components of UE 115 as described herein. Device 1305 may include components for bi-directional voice and data communications including components for transmitting and receiving communications, including UE communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting joint encoding waveform and slot information).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support joint encoding waveform and slot information. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
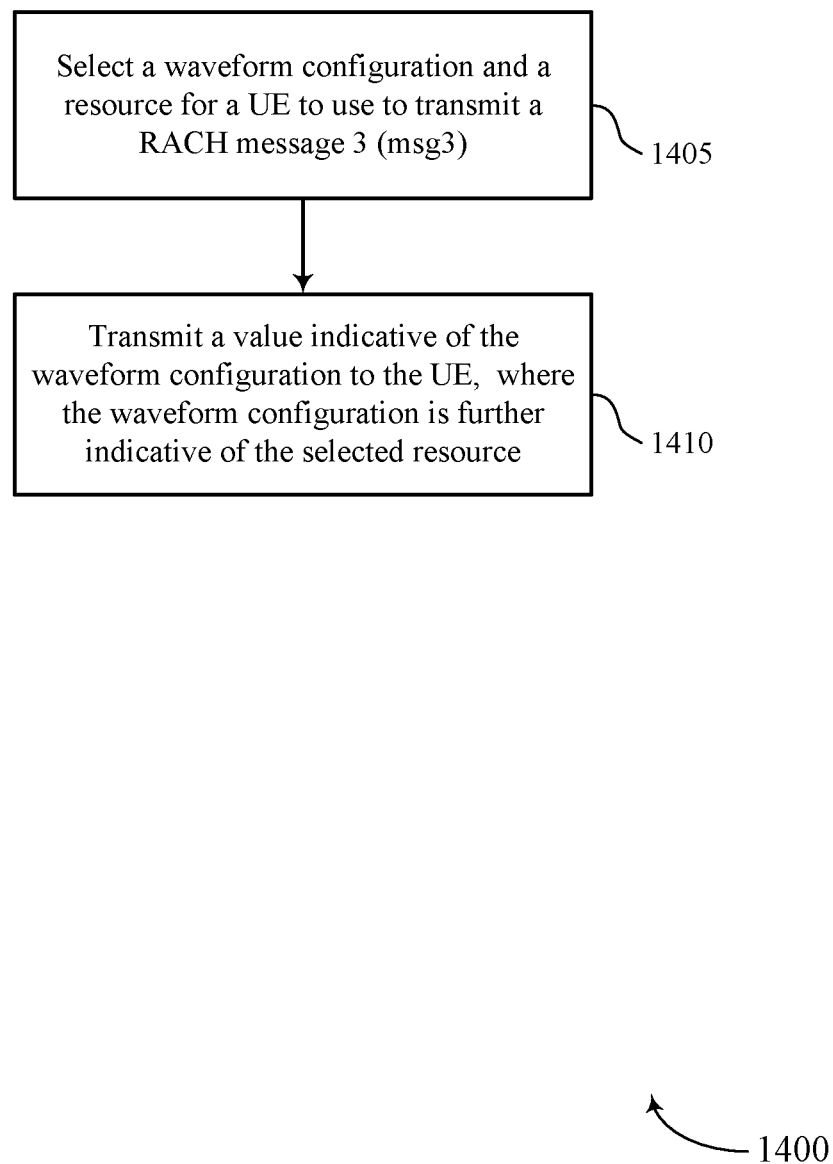
FIGS. 14 through 22 illustrate methods for joint encoding waveform and slot information, in accordance with one or more aspects of the present disclosure.

FIG. 14 shows a flowchart illustrating a method 1400 for joint encoding waveform and slot information, in accordance with one or more aspects of the present disclosure. The operations of method 1400 may be implemented by a base station 105 or its components as described herein. For example, the operations of method 1400 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may select a waveform configuration and a resource for a UE to use to transmit a RACH msg3. The operations of block 1405 may be performed according to the methods described herein. In certain examples, aspects of the operations of block 1405 may be performed by a joint encoding manager as described with reference to FIGS. 6 through 9.

At block 1410 the base station 105 may transmit a value indicative of the waveform configuration to the UE, wherein the waveform configuration is further indicative of the selected resource. The operations of block 1410 may be performed according to the methods described herein. In certain examples, aspects of the operations of block 1410 may be performed by a RACH manager as described with reference to FIGS. 6 through 9.

Figure 15:
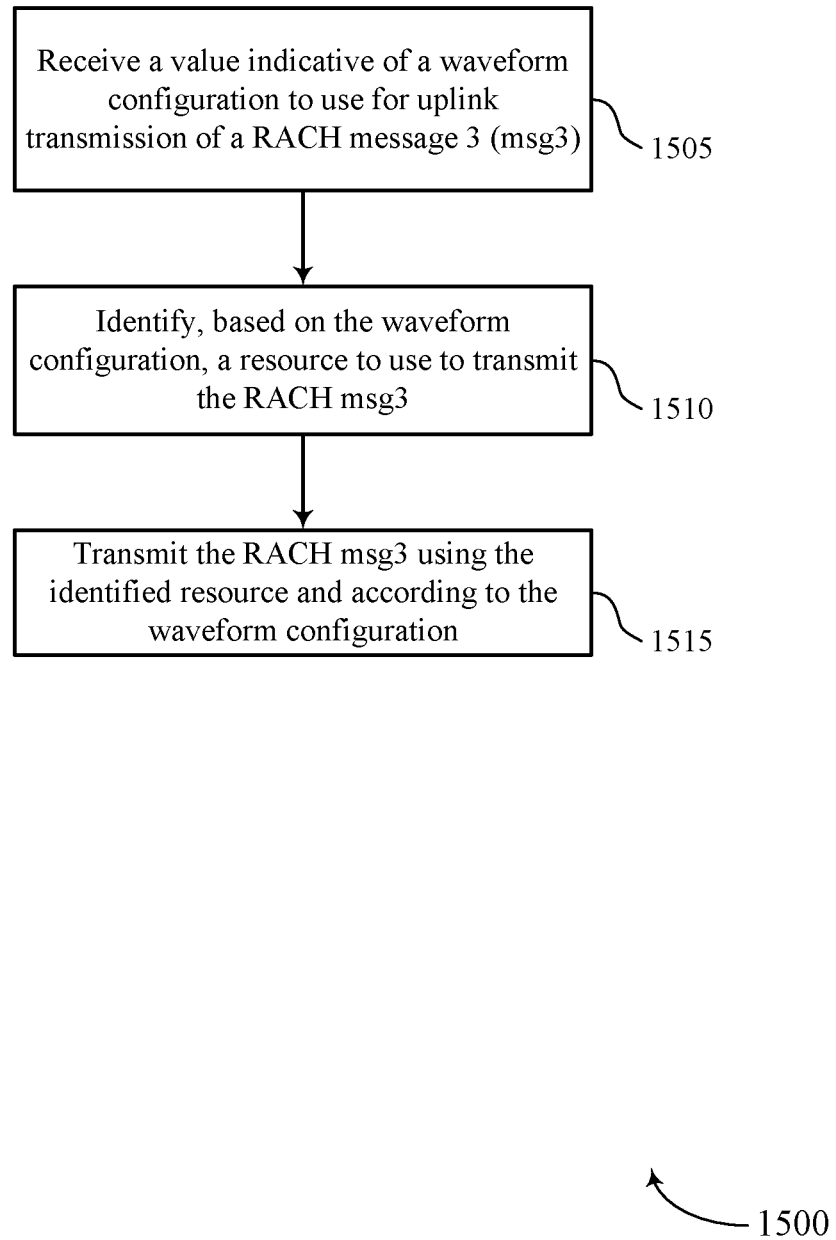

FIG. 15 shows a flowchart illustrating a method 1500 for joint encoding waveform and slot information, in accordance with one or more aspects of the present disclosure. The operations of method 1500 may be implemented by a UE 115 or its components as described herein. For example, the operations of method 1500 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive a value indicative of a waveform configuration to use for uplink transmission of a RACH msg3. The operations of block 1505 may be performed according to the methods described herein. In certain examples, aspects of the operations of block 1505 may be performed by a RACH manager as described with reference to FIGS. 10 through 13.

At block 1510 the UE 115 may identify, based at least in part on the waveform configuration, a resource to use to transmit the RACH msg3. The operations of block 1510 may be performed according to the methods described herein. In certain examples, aspects of the operations of block 1510 may be performed by a joint encoding manager as described with reference to FIGS. 10 through 13.

At block 1515 the UE 115 may transmit the RACH msg3 using the identified resource and according to the waveform configuration. The operations of block 1515 may be performed according to the methods described herein. In certain examples, aspects of the operations of block 1515 may be performed by a RACH manager as described with reference to FIGS. 10 through 13.

Figure 16:
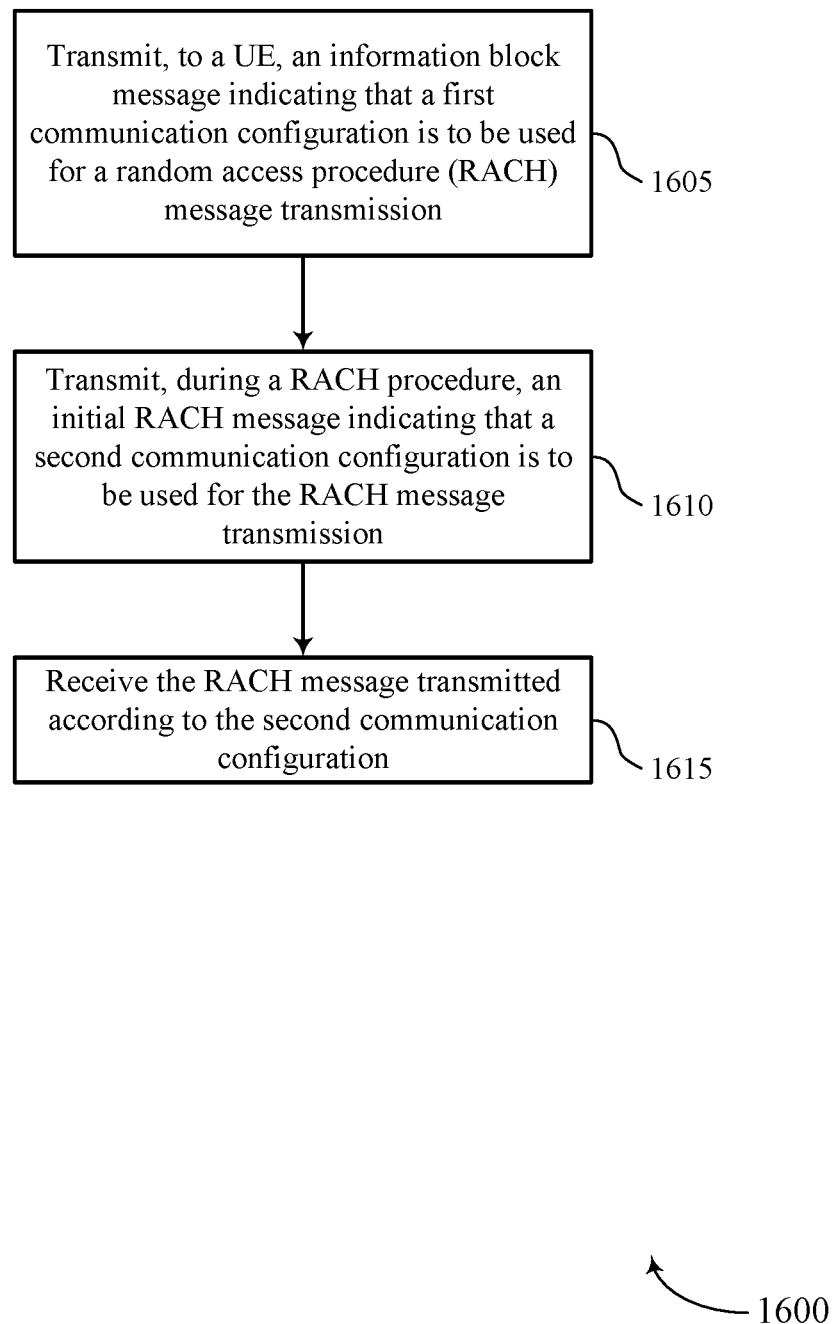

FIG. 16 shows a flowchart illustrating a method 1600 for joint encoding waveform and slot information, in accordance with one or more aspects of the present disclosure. The operations of method 1600 may be implemented by a base station 105 or its components as described herein. For example, the operations of method 1600 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may transmit, to a UE, an information block message indicating that a first communication configuration is to be used for a RACH message transmission. The operations of block 1605 may be performed according to the methods described herein. In certain examples, aspects of the operations of block 1605 may be performed by a RACH manager as described with reference to FIGS. 6 through 9.

At block 1610 the base station 105 may transmit, during a RACH procedure, an initial RACH message indicating that a second communication configuration is to be used for the RACH message transmission. The operations of block 1610 may be performed according to the methods described herein. In certain examples, aspects of the operations of block 1610 may be performed by a RACH manager as described with reference to FIGS. 6 through 9.

At block 1615 the base station 105 may receive the RACH message transmitted according to the second communication configuration. The operations of block 1615 may be performed according to the methods described herein. In certain examples, aspects of the operations of block 1615 may be performed by a RACH manager as described with reference to FIGS. 6 through 9.

Figure 17:
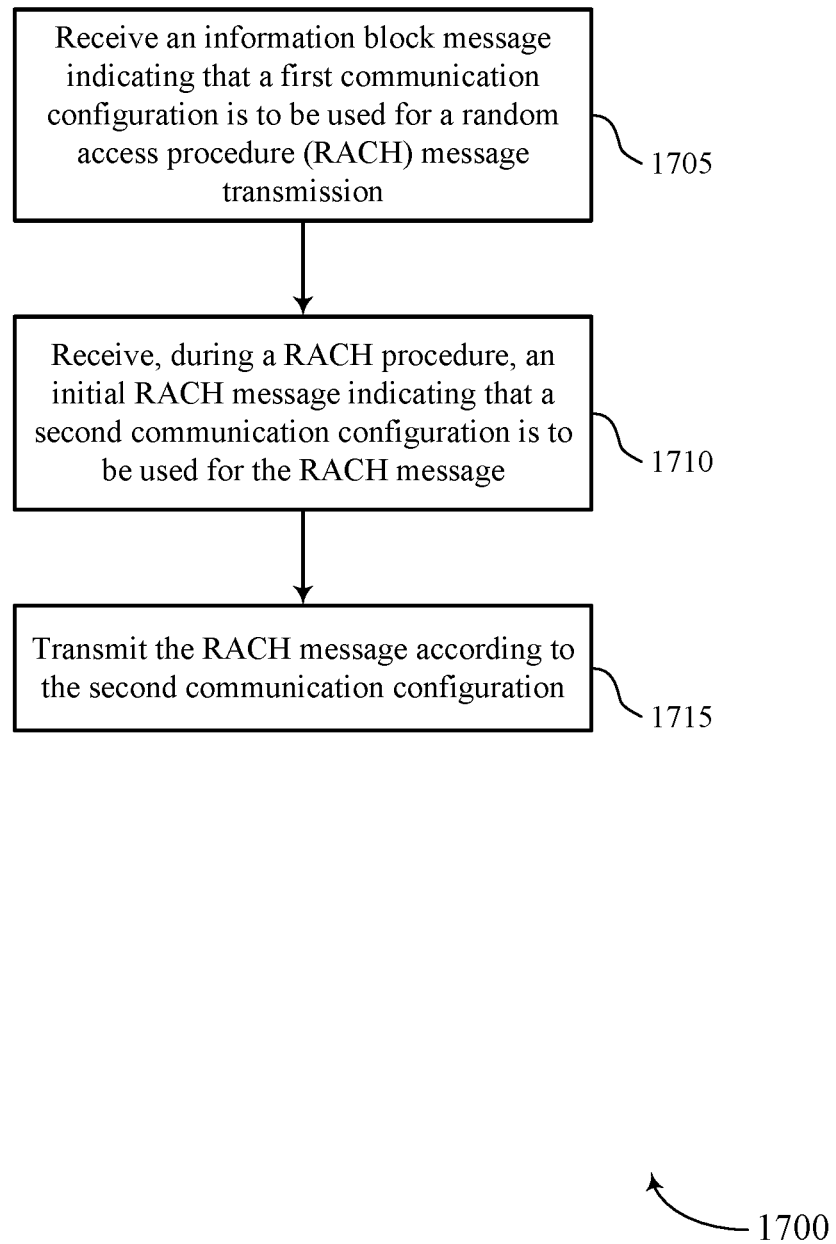

FIG. 17 shows a flowchart illustrating a method 1700 for joint encoding waveform and slot information, in accordance with one or more aspects of the present disclosure. The operations of method 1700 may be implemented by a UE 115 or its components as described herein. For example, the operations of method 1700 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive an information block message indicating that a first communication configuration is to be used for a RACH message transmission. The operations of block 1705 may be performed according to the methods described herein. In certain examples, aspects of the operations of block 1705 may be performed by a RACH manager as described with reference to FIGS. 10 through 13.

At block 1710 the UE 115 may receive, during a RACH procedure, an initial RACH message indicating that a second communication configuration is to be used for the RACH message. The operations of block 1710 may be performed according to the methods described herein. In certain examples, aspects of the operations of block 1710 may be performed by a RACH manager as described with reference to FIGS. 10 through 13.

At block 1715 the UE 115 may transmit the RACH message according to the second communication configuration. The operations of block 1715 may be performed according to the methods described herein. In certain examples, aspects of the operations of block 1715 may be performed by a RACH manager as described with reference to FIGS. 10 through 13.

Figure 18:
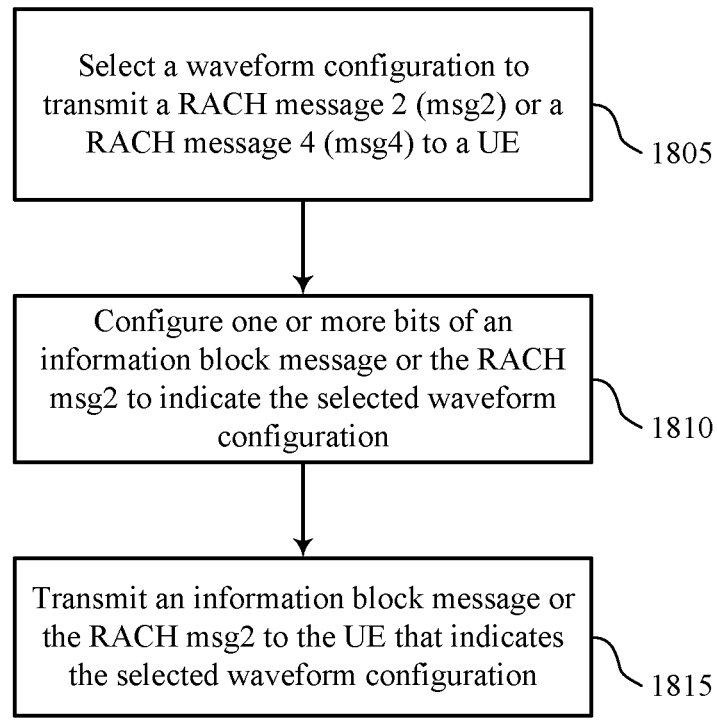

FIG. 18 shows a flowchart illustrating a method 1800 for joint encoding waveform and slot information, in accordance with one or more aspects of the present disclosure. The operations of method 1800 may be implemented by a base station 105 or its components as described herein. For example, the operations of method 1800 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may select a waveform configuration to transmit a RACH msg2 or a RACH msg4 to a UE. The operations of block 1805 may be performed according to the methods described herein. In certain examples, aspects of the operations of block 1805 may be performed by a resource manager as described with reference to FIGS. 6 through 9.

At block 1810 the base station 105 may configure one or more bits of an information block message or the RACH msg2 to indicate the selected waveform configuration. The operations of block 1810 may be performed according to the methods described herein. In certain examples, aspects of the operations of block 1810 may be performed by a joint encoding manager as described with reference to FIGS. 6 through 9.

At block 1815 the base station 105 may transmit an information block message or the RACH msg2 to the UE that indicates the selected waveform configuration. The operations of block 1815 may be performed according to the methods described herein. In certain examples, aspects of the operations of block 1815 may be performed by a RACH manager as described with reference to FIGS. 6 through 9.

Figure 19:
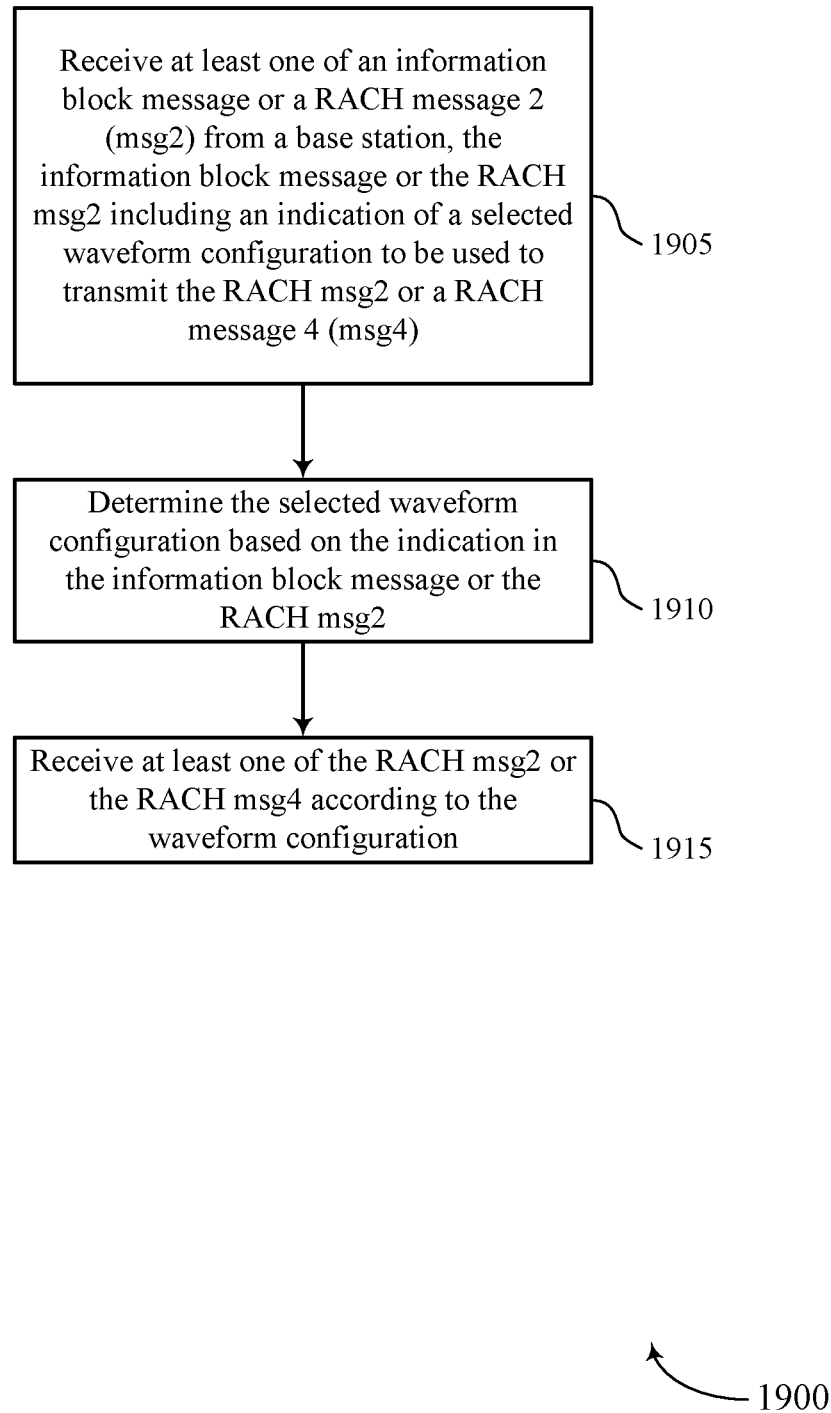

FIG. 19 shows a flowchart illustrating a method 1900 for joint encoding waveform and slot information, in accordance with one or more aspects of the present disclosure.

The operations of method 1900 may be implemented by a UE 115 or its components as described herein. For example, the operations of method 1900 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive at least one of an information block message or a RACH msg2 from a base station, the information block message or the RACH msg2 comprising an indication of a selected waveform configuration to be used to transmit the RACH msg2 or a RACH message 4 (msg4). The operations of block 1905 may be performed according to the methods described herein. In certain examples, aspects of the operations of block 1905 may be performed by a RACH manager as described with reference to FIGS. 10 through 13.

At block 1910 the UE 115 may determine the selected waveform configuration based on the indication in the information block message or the RACH msg2. The operations of block 1910 may be performed according to the methods described herein. In certain examples, aspects of the operations of block 1910 may be performed by a joint encoding manager as described with reference to FIGS. 10 through 13.

At block 1915 the UE 115 may receive at least one of the RACH msg2 or the RACH msg4 according to the waveform configuration. The operations of block 1915 may be performed according to the methods described herein. In certain examples, aspects of the operations of block 1915 may be performed by a RACH manager as described with reference to FIGS. 10 through 13.

Figure 20:
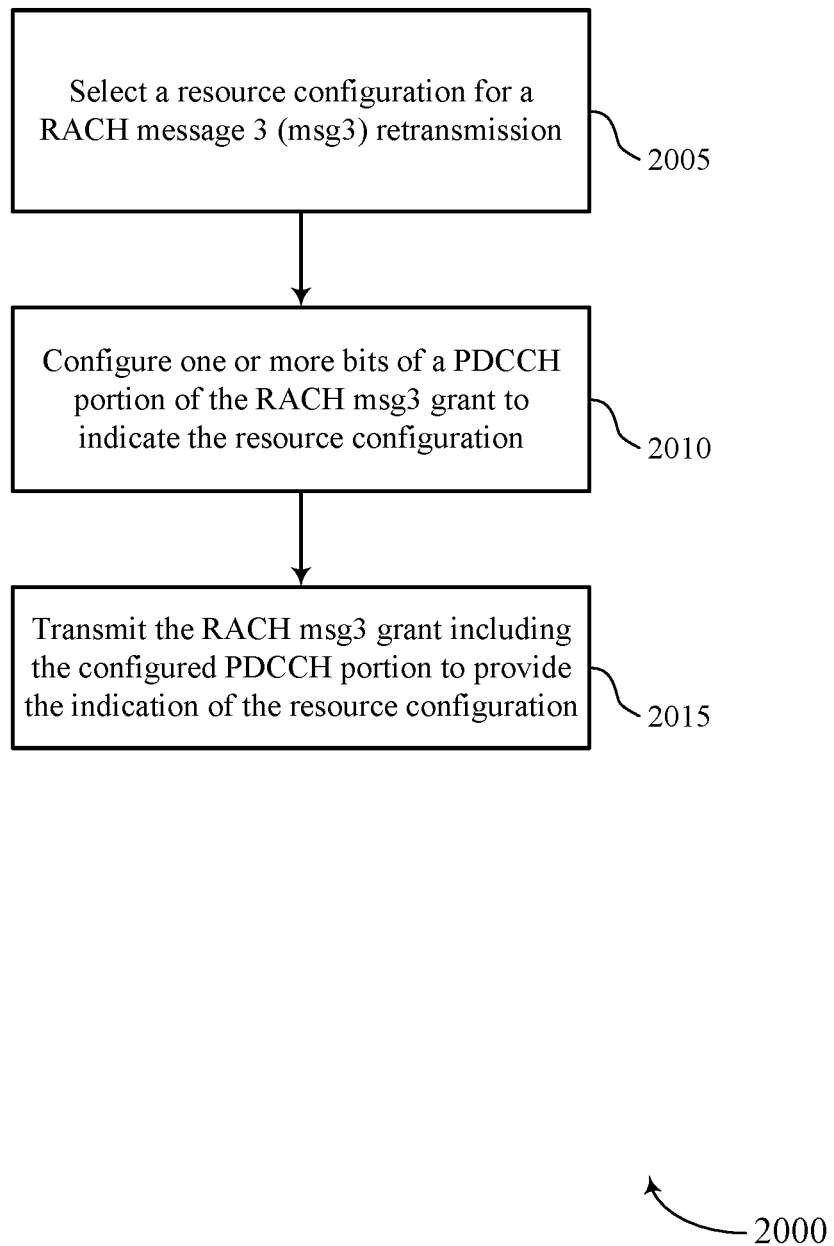

FIG. 20 shows a flowchart illustrating a method 2000 for joint encoding waveform and slot information, in accordance with one or more aspects of the present disclosure. The operations of method 2000 may be implemented by a base station 105 or its components as described herein. For example, the operations of method 2000 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may select a resource configuration for a RACH msg3 retransmission. The operations of block 2005 may be performed according to the methods described herein. In certain examples, aspects of the operations of block 2005 may be performed by a resource manager as described with reference to FIGS. 6 through 9.

At block 2010 the base station 105 may configure one or more bits of a PDCCH portion of the RACH msg3 grant to indicate the resource configuration. The operations of block 2010 may be performed according to the methods described herein. In certain examples, aspects of the operations of block 2010 may be performed by a joint encoding manager as described with reference to FIGS. 6 through 9.

At block 2015 the base station 105 may transmit the RACH msg3 grant comprising the configured PDCCH portion to provide the indication of the resource configuration. The operations of block 2015 may be performed according to the methods described herein. In certain examples, aspects of the operations of block 2015 may be performed by a RACH manager as described with reference to FIGS. 6 through 9.

Figure 21:
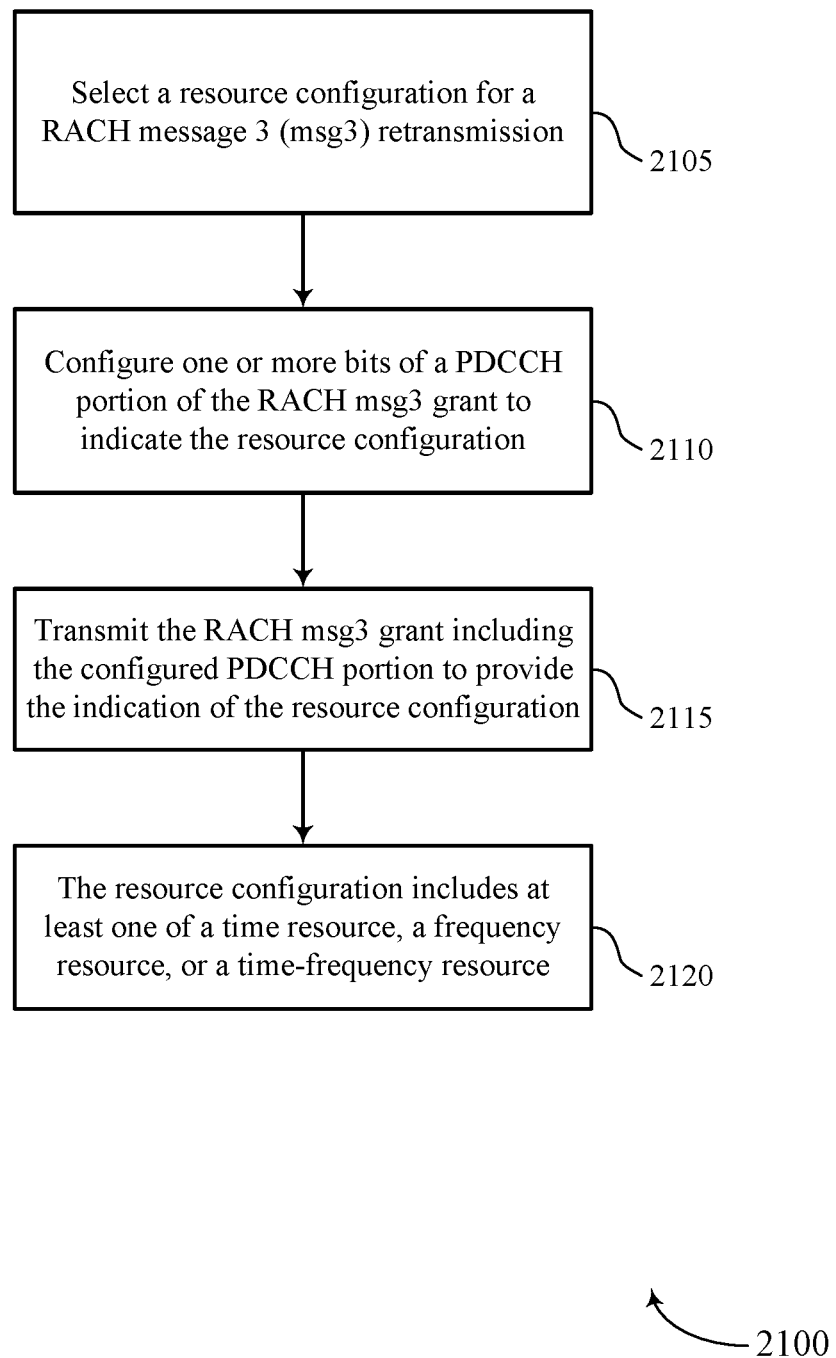

FIG. 21 shows a flowchart illustrating a method 2100 for joint encoding waveform and slot information, in accordance with one or more aspects of the present disclosure. The operations of method 2100 may be implemented by a base station 105 or its components as described herein. For example, the operations of method 2100 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may select a resource configuration for a RACH msg3 retransmission. The operations of block 2105 may be performed according to the methods described herein. In certain examples, aspects of the operations of block 2105 may be performed by a resource manager as described with reference to FIGS. 6 through 9.

At block 2110 the base station 105 may configure one or more bits of a PDCCH portion of the RACH msg3 grant to indicate the resource configuration. The operations of block 2110 may be performed according to the methods described herein. In certain examples, aspects of the operations of block 2110 may be performed by a joint encoding manager as described with reference to FIGS. 6 through 9.

At block 2115 the base station 105 may transmit the RACH msg3 grant comprising the configured PDCCH portion to provide the indication of the resource configuration. The operations of block 2115 may be performed according to the methods described herein. In certain examples, aspects of the operations of block 2115 may be performed by a RACH manager as described with reference to FIGS. 6 through 9.

At block 2120 the base station 105 may determine that the resource configuration comprises at least one of a time resource, a frequency resource, or a time-frequency resource. The operations of block 2120 may be performed according to the methods described herein. In certain examples, aspects of the operations of block 2120 may be performed by a resource manager as described with reference to FIGS. 6 through 9.

Figure 22:
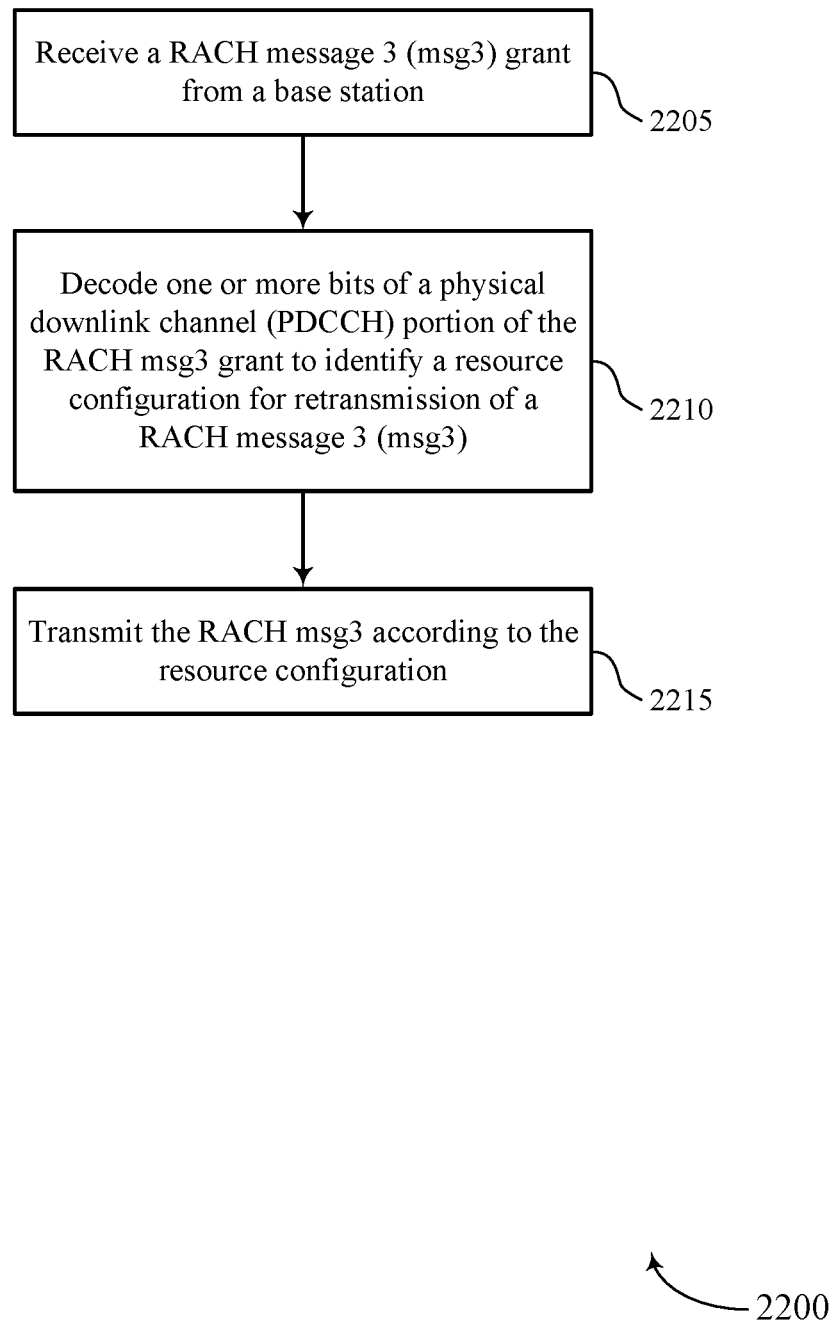

FIG. 22 shows a flowchart illustrating a method 2200 for joint encoding waveform and slot information, in accordance with one or more aspects of the present disclosure. The operations of method 2200 may be implemented by a UE 115 or its components as described herein. For example, the operations of method 2200 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 2205 the UE 115 may receive a RACH msg3 grant from a base station. The operations of block 2205 may be performed according to the methods described herein. In certain examples, aspects of the operations of block 2205 may be performed by a RACH manager as described with reference to FIGS. 10 through 13.

At block 2210 the UE 115 may decode one or more bits of a PDCCH portion of the RACH msg3 grant to identify a resource configuration for retransmission of a RACH msg3. The operations of block 2210 may be performed according to the methods described herein. In certain examples, aspects of the operations of block 2210 may be performed by a joint encoding manager as described with reference to FIGS. 10 through 13.

At block 2215 the UE 115 may retransmit the RACH msg3 according to the resource configuration. The operations of block 2215 may be performed according to the methods described herein. In certain examples, aspects of the operations of block 2215 may be performed by a RACH manager as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS), LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communication system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:

receiving a physical downlink control channel (PDCCH) portion of a random access channel (RACH) message 2 (msg2) including one or more information bits;

decoding the one or more information bits of the PDCCH portion of the RACH msg2 to determine a waveform configuration used by a base station to transmit at least a remaining portion of the RACH msg2;

determining the waveform configuration based at least in part on decoding the one or more information bits of the PDCCH portion of the RACH msg2; and receiving at least the remaining portion of the RACH msg2 according to the waveform configuration, wherein the remaining portion of the RACH msg2 includes a repetition of the one or more information bits.

2. The method of claim 1, further comprising:

decoding one or more bits of a minimum system information block (MSIB) message to determine the waveform configuration.

3. The method of claim 1, further comprising:

decoding one or more bits of a minimum system information block (MSIB) message and the one or more information bits of the PDCCH portion of the RACH msg2 to determine the waveform configuration for both the RACH msg2 and the RACH msg4.

4. The method of claim 1, further comprising:

decoding one or more bits of an information block message or the one or more information bits of the remaining portion of the RACH msg2 to determine the waveform configuration for both the RACH msg2 and the RACH msg4.

5. An apparatus for wireless communication, comprising:
a processor;
memory coupled with the processor;
and instructions stored in the memory and executable by the processor to cause the apparatus to:
receive a physical downlink control channel (PDCCH) portion of a random access channel (RACH) message 2 (msg2) including one or more information bits;
decode the one or more information bits of the PDCCH portion of the RACH msg2 to determine a waveform configuration used by a base station to transmit at least a remaining portion of the RACH msg2;
determine the waveform configuration based at least in part on decoding the one or more information bits of the PDCCH portion of the RACH msg2; and
receive at least the remaining portion of the RACH msg2 according to the waveform configuration, wherein the remaining portion of the RACH msg2 includes a repetition of the one or more information bits.

6. The apparatus of claim 5, wherein the instructions are further executable by the processor to cause the apparatus to:
decode one or more bits of a minimum system information block (MSIB) message to determine the waveform configuration.

7. The apparatus of claim 5, wherein the instructions are further executable by the processor to cause the apparatus to:
decode one or more bits of a minimum system information block (MSIB) message and the one or more information bits of the PDCCH portion of the RACH msg2 to determine the waveform configuration for both the RACH msg2 and the RACH msg4.

8. The apparatus of claim 5, wherein the instructions are further executable by the processor to cause the apparatus to:
decode one or more bits of an information block message or the one or more information bits of the remaining portion of the RACH msg2 to determine the waveform configuration for both the RACH msg2 and the RACH msg4.

9. An apparatus for wireless communication, comprising:
means for receiving a physical downlink control channel (PDCCH) portion of a random access channel (RACH) message 2 (msg2) including one or more information bits;
means for decoding the one or more information bits of the PDCCH portion of the RACH msg2 to determine a waveform configuration used by a base station to transmit at least a remaining portion of the RACH msg2;
means for determining the waveform configuration based at least in part on decoding the one or more information bits of the PDCCH portion of the RACH msg2; and
means for receiving at least the remaining portion of the RACH msg2 according to the waveform configuration, wherein the remaining portion of the RACH msg2 includes a repetition of the one or more information bits.

10. The apparatus of claim 9, further comprising:
means for decoding one or more bits of a minimum system information block (MSIB) message to determine the waveform configuration.

11. The apparatus of claim 9, further comprising:
means for decoding one or more bits of a minimum system information block (MSIB) message and the one or more information bits of the PDCCH portion of the RACH msg2 to determine the waveform configuration for both the RACH msg2 and the RACH msg4.

12. The apparatus of claim 9, further comprising:
means for decoding one or more bits of an information block message or the one or more information bits of the remaining portion of the RACH msg2 to determine the waveform configuration for both the RACH msg2 and the RACH msg4.

13. A non-transitory computer-readable medium storing code for wireless communication, the code comprising instructions executable by a processor to:
receive a physical downlink control channel (PDCCH) portion of a random access channel (RACH) message 2 (msg2) including one or more information bits;
decode the one or more information bits of the PDCCH portion of the RACH msg2 to determine a waveform configuration used by a base station to transmit at least a remaining portion of the RACH msg2;
determine the waveform configuration based at least in part on decoding the one or more information bits of the PDCCH portion of the RACH msg2; and
receive at least one of the remaining portion of the RACH msg2 according to the waveform configuration, wherein the remaining portion of the RACH msg2 includes a repetition of the one or more information bits.

14. The non-transitory computer-readable medium of claim 13, wherein the instructions are further executable by the processor to:
decode one or more bits of a minimum system information block (MSIB) message to determine the waveform configuration.

15. The non-transitory computer-readable medium of claim 13, wherein the instructions are further executable by the processor to:
decode one or more bits of a minimum system information block (MSIB) message and the one or more information bits of the PDCCH portion of the RACH msg2 to determine the waveform configuration for both the RACH msg2 and the RACH msg4.

16. The non-transitory computer-readable medium of claim 13, wherein the instructions are further executable by the processor to:
decode one or more bits of an information block message or the one or more information bits of the remaining portion of the RACH msg2 to determine the waveform configuration for both the RACH msg2 and the RACH msg4.

* * * * *